US012413690B2

(12) United States Patent
Lee et al.

(10) Patent No.: US 12,413,690 B2
(45) Date of Patent: Sep. 9, 2025

(54) METHOD, SYSTEM, AND APPARATUS FOR GENERATING OPTIMAL IMAGING SEQUENCE FOR PLURALITY OF SATELLITES

(71) Applicant: Korea Aerospace Research Institute, Yuseong-gu Daejeon (KR)

(72) Inventors: Seonho Lee, Yuseong-gu Daejeon (KR); Kimoon Lee, Yuseong-gu Daejeon (KR); Dongjin Kim, Yuseong-gu Daejeon (KR); Dae Won Chung, Yuseong-gu Daejeon (KR)

(73) Assignee: Korea Aerospace Research Institute, Yuseong-su Daejeon (KR)

( * ) Notice: Subject to any disclaimer, the term of this patent is extended or adjusted under 35 U.S.C. 154(b) by 0 days.

(21) Appl. No.: 18/759,018

(22) Filed: Jun. 28, 2024

(65) Prior Publication Data

US 2025/0047814 A1 Feb. 6, 2025

(30) Foreign Application Priority Data

Aug. 3, 2023 (KR) .................. 10-2023-0101742

(51) Int. Cl.
*H04N 7/18* (2006.01)
*G06T 7/70* (2017.01)

(52) U.S. Cl.
CPC .............. *H04N 7/181* (2013.01); *G06T 7/70* (2017.01); *G06T 2207/10016* (2013.01); *G06T 2207/10032* (2013.01); *G06T 2207/30181* (2013.01)

(58) Field of Classification Search
CPC .......... H04N 7/181; H04N 7/18; H04N 7/183; G06T 7/70; G06T 2207/10016; G06T 2207/10032; G06T 2207/30181; G06V 20/13
USPC ................................. 348/144, 143
See application file for complete search history.

(56) References Cited

U.S. PATENT DOCUMENTS 5,596,494 A * 1/1997 Kuo ............... G09B 29/106
348/144

FOREIGN PATENT DOCUMENTS

| CN | 113568426 A | 10/2021 |
|----|----|----|
| JP | 2010061216 A | 3/2010 |
| KR | 20030046757 A | 6/2003 |

OTHER PUBLICATIONS

Lee, Kimoon et al, "Optimal Mission Planning for Multiple Agile Satellites Using Modified Dynamic Programming", 2023 Advanced Maui Optical and Space Surveillance Technologies Conference (AMOS), Nov. 29, 2023, 12 pages.

(Continued)

*Primary Examiner* — Sherrie Hsia
(74) *Attorney, Agent, or Firm* — Panitch Schwarze Belisario & Nadel LLP

(57) ABSTRACT

Provided are a method, a system, and an apparatus for generating an optimal imaging sequence for a plurality of satellites. More particularly, provided are a method, a system, and an apparatus for generating an optimal imaging sequence for establishing an efficient imaging mission plan for a ground target imaging mission by using a plurality of earth observation satellites.

15 Claims, 11 Drawing Sheets

(56) References Cited

OTHER PUBLICATIONS

Extended European Search Report, issued on Feb. 10, 2025, in corresponding European Application No. 24184478.6-1099, 13 pages.
Chu, Xiaogeng et al, "An anytime branch and bound algorithm for agile earth observation satellite onboard scheduling", Advances in Space Research, vol. 60, No. 9, Jul. 25, 2017, pp. 2077-2090.

* cited by examiner

METHOD, SYSTEM, AND APPARATUS FOR GENERATING OPTIMAL IMAGING SEQUENCE FOR PLURALITY OF SATELLITES

CROSS-REFERENCE TO RELATED APPLICATION

This application is based on and claims priority under 35 U.S.C. § 119 to Korean Patent Application No. 10-2023-0101742, filed on Aug. 3, 2023, in the Korean Intellectual Property Office, the disclosure of which is incorporated by reference herein in its entirety.

BACKGROUND

1. Field

The disclosure relates to a method, system, and apparatus for generating an optimal imaging sequence for a plurality of satellites, and more particularly to, a method, system, and apparatus for generating an optimal imaging sequence for establishing an efficient imaging mission plan for a ground target imaging mission by using a plurality of earth observation satellites.

2. Description of the Related Art

Recently, as techniques related to satellite operation and control have been continually advanced and service industries associated with satellite operation techniques have been rapidly developed, the use of and dependency on satellites have drastically risen, which increased the number of missions required of satellites. At an early stage of space developments, missions performed by satellites were mostly simple and repetitive, but nowadays, images may be obtained in various modes by high-resolution satellites. Thus, various missions are required and conditions and restrictions for fulfilling these missions vary. Research into efficient satellite operation in accordance with this changed situation of satellite operation is required.

Particularly, a satellite captures an image in response to a user's command by using an optical/infrared camera or an observation sensor such as a synthetic aperture radar. Such an imaging mission of the satellite is planned in advance in a ground control station and transmitted to the satellite, and after the imaging by the satellite, original image data is transmitted again to the ground control station. As described above, all controlling and managing operations including scheduling of the satellite mission are performed by the ground control station. In order to obtain an image by using a camera on the satellite, a satellite image management system has to plan a mission for capturing an image and an imaging mission for receiving the captured image in the ground control station. A satellite's imaging mission plan is used for determining an imaging target and an imaging time for the satellite and it is one of the main operations performed by the ground control station.

According to satellite image management systems of the related art, in the case of an earth observation satellite at a low orbit at an altitude of about 500 km to about 600 km and an earth observation satellite of a sun-synchronous orbit, the satellites pass over the Korean Peninsula twice a day, and in most cases, the number of targets available for imaging is limited during each visit in a mission area. Thus, the ground control station controlling an artificial satellite establishes a sequential imaging mission plan by considering a priority order of each of targets. All low-altitude earth observation satellites (for example, Arirang 3, 3A, 425 EO/IR satellites) in operation in Korea are Agile satellites (for example, satellites capable of high-speed posture maneuvering in roll and pitch directions). However, there is no imaging mission plan algorithm that takes into account this agility of the satellites. Thus, due to an inefficient imaging mission plan caused thereby, a long time is taken from an imaging request by a user to the image delivery by the satellite.

SUMMARY

Provided is a method of generating an optimal imaging sequence for ground target imaging for a plurality of earth observation satellites.

Provided is a system for generating an optimal imaging sequence for ground target imaging for a plurality of earth observation satellites.

Provided is an apparatus for generating an optimal imaging sequence for ground target imaging for a plurality of earth observation satellites.

Additional aspects will be set forth in part in the description which follows and, in part, will be apparent from the description, or may be learned by practice of the presented embodiments of the disclosure.

According to an aspect of the disclosure, a method, performed by at least one computing device, of generating an optimal imaging sequence for a plurality of satellites includes obtaining a position and a target profit of each of I imaging targets, obtaining orbit information about each of J satellites, with respect to an arbitrary satellite j (j∈J) from among the J satellites, calculating K available times for imaging each including an available start time for imaging and an available end time for imaging with respect to an arbitrary imaging target (i, i∈I) from among the I imaging targets, with respect to an arbitrary first imaging target i and an arbitrary second imaging target i' from among the I imaging targets, calculating a posture maneuverability time of the arbitrary satellite j for maneuvering from a first satellite posture for imaging the arbitrary first imaging target i to a second satellite posture for imaging the arbitrary second imaging target i', with respect to the arbitrary first imaging target i and the arbitrary second imaging target i' from among the I imaging targets, obtaining a result of availability of consecutive imaging between the arbitrary first imaging target i and the arbitrary second imaging target i' based on a kth available time for imaging from among the K available times for imaging calculated with respect to the arbitrary first imaging target i and the posture maneuverability time of the arbitrary satellite j, based on the result of availability of the consecutive imaging between the arbitrary first imaging target i and the arbitrary second imaging target i' from among the I imaging targets, generating a plurality of candidate imaging sequences including at least two arbitrary imaging targets (i, i∈I) from among the I imaging targets, calculating a plurality of imaging sequence profits from the plurality of candidate imaging sequences, respectively, by using a pre-defined optimization objective function, and determining, as an optimal imaging sequence, a set of at least two arbitrary imaging targets (i, i∈I) from among the I imaging targets, included in a candidate imaging sequence having a largest imaging sequence profit of the plurality of imaging sequence profits.

The method may further include, with respect to the arbitrary satellite j (j∈J) from among the J satellites, calculating T imaging sequence profits from T candidate imaging sequences, respectively, wherein a $t^{th}$ imaging sequence profit $P_{j,t}$ corresponding to a $t^{th}$ candidate imaging sequence from among the T imaging sequence profits is calculated according to $P_{j,t}=\sum_{k=1}^{V_{ij}} p_i x_{ijk,t}$ where I is a total number of imaging targets, $p_i$ is a target profit of the arbitrary first imaging target i from among the I imaging targets, $V_{ij}$ is a number of available times for imaging with respect to the arbitrary first imaging target i, and $x_{ijk,t}$ is an imaging determination value of the arbitrary satellite j with respect to the arbitrary first imaging target i in the $t^{th}$ candidate imaging sequence.

The largest imaging sequence profit P may be defined as $P=\max(\sum_{j=1}^{J}\sum_{t=1}^{T}p_{j,t})$, and the optimal imaging sequence may include, in the $t^{th}$ candidate imaging sequence of the arbitrary satellite j (j∈J) having the largest imaging sequence profit from among the J satellites, the arbitrary first imaging targets i having 1 as the imaging determination value $x_{ijk,t}$, for the arbitrary satellite j with respect to the arbitrary imaging target (i, i∈I) from among the I imaging targets.

A target profit $p_i$ of the arbitrary first imaging target i of the I imaging targets may be calculated according to $p_i=a\times s_i+(1-a)u_i$ where $s_i$ is a value indicating a degree of significance of the arbitrary first imaging target i, $u_i$ is a value indicating a degree of imaging urgency of the arbitrary first imaging target i, and a is a pre-set weight value between about 0 and about 1.

The posture maneuverability time $t^m_{ii'j}$ of the arbitrary satellite j may be calculated based on $t^m_{ii'j}=\theta_{ii'j}/\omega_j$ where $\omega_j$ is a maneuverability angular velocity of the arbitrary satellite j, and $\theta_{ii'j}$ is a posture maneuverability angle of the arbitrary satellite j formed by a vector from the arbitrary satellite j to the arbitrary first imaging target i and a vector from the arbitrary satellite j to the arbitrary second imaging target i' and is defined as $$\theta_{ii'j} = \arccos(\vec{r} \cdot \vec{r'})$$

where $$\vec{r}$$

is a unit vector from the arbitrary satellite j to the arbitrary first imaging target i and $$\vec{r'}$$

is a unit vector from the arbitrary satellite j to the arbitrary second imaging target i'.

The obtaining of the result of availability of the consecutive imaging between the arbitrary first imaging target i and the arbitrary second imaging target i' may further include, when it is determined as $t^s_{ijk}+t^o_{ij}+t^m_{ii'j}+t^s_j \leq t^s_{i'jk}$, setting 1 as the imaging determination value $x_{ijk,t}$ of the arbitrary satellite j with respect to the arbitrary first imaging target i in the $t^{th}$ candidate imaging sequence of the arbitrary satellite j, wherein $t^s_{ijk}$ is an actual start time for imaging by the arbitrary satellite j with respect to the arbitrary first imaging target i during the kth available time for imaging from among the K available times for imaging possessed by the arbitrary satellite j with respect to the arbitrary first imaging target i, $t^s_{i'jk}$ is an actual start time for imaging by the arbitrary satellite j with respect to the arbitrary second imaging target i' during the kth available time for imaging from among the K available times for imaging possessed by the arbitrary satellite j with respect to the arbitrary second imaging target i', $t^o_{ij}$ is an imaging time by the arbitrary satellite j with respect to the arbitrary first imaging target i, $t^m_{ii'j}$ is a posture maneuverability time for the arbitrary satellite j to maneuver from a posture for imaging the arbitrary first imaging target i to a posture for imaging the arbitrary second imaging target i', and $t^s_j$ is a posture stabilization time of the arbitrary satellite j.

The obtaining of the result of availability of the consecutive imaging between the arbitrary first imaging target i and the arbitrary second imaging target i' may further include, when it is determined as $t^s_{ijk}+t^o_{ij}+t^m_{ii'j}+t^s_j > t^s_{i'jk}$, setting 0 as the imaging determination value $x_{ijk,t}$ of the arbitrary satellite j with respect to the arbitrary first imaging target i in the $t^{th}$ candidate imaging sequence of the arbitrary satellite j, and changing the arbitrary second imaging target i' to another arbitrary imaging target (i'', i''∈I) except for the arbitrary first imaging target i and the arbitrary second imaging target i' from among the I imaging targets.

The actual start time $t^s_{ijk}$ for imaging by the arbitrary satellite j during the $k^{th}$ available time for imaging possessed by the arbitrary satellite j with respect to the arbitrary first imaging target i may satisfy $T^s_{ijk} \leq t^s_{ijk}$, where $T^s_{ijk}$ is an available start time for imaging of the $k^{th}$ available time for imaging, and an actual end time $t^s_{ijk}+t^o_{ij}$ for imaging by the arbitrary satellite j with respect to the arbitrary first imaging target i during the $k^{th}$ available time for imaging may satisfy $t^s_{ijk}+t^o_{ij} \leq T^e_{ijk}$ where $T^e_{ijk}$ is an available end time for imaging of the $k^{th}$ available time for imaging.

A maximum available time $D_t$ for imaging of the J satellites may be defined as $D_t=\sum_{j=1}^{J}\sum_{i=1}^{I}\sum_{k=1}^{V_{ij}}t^o_{ij}x_{ijk,t}$, and the maximum available time $D_t$ may satisfy $D_t=\sum_{j=1}^{J}\sum_{i=1}^{I}\sum_{k=1}^{V_{ij}}t^o_{ij}x_{ijk,t}$ where $d_j$ is a maximum available time for imaging by the arbitrary satellite j.

The generating of the candidate imaging sequences of the arbitrary satellite j may further include, when it is determined as $t^s_{ijk}+t^o_{ij}+t^m_{ii'j}+t^s_j \leq t^s_{i'jk}$, determining the arbitrary second imaging target i' as a next imaging target of the arbitrary first imaging target i.

The imaging determination value $x_{ijk,t}$ of the arbitrary satellite j with respect to the arbitrary first imaging target i in the $t^{th}$ candidate imaging sequence of the arbitrary satellite j may satisfy $N_i^{min} \leq \sum_{j=1}^{J}\sum_{k=1}^{V_{ij}}x_{ijk,t} \leq N_i^{max}$ where $N_i^{min}$ is a pre-set minimum number of times of imaging of the arbitrary first imaging target i and $N_i^{max}$ is a pre-set maximum number of times of imaging of the arbitrary first imaging target i.

According to another aspect of the disclosure, a computer program is stored in a medium to execute, by using a computing device, the method of generating the optimal imaging sequence for the plurality of satellites described above.

According to another aspect of the disclosure, a system for generating an optimal imaging sequence for a plurality of satellites includes a ground station to obtain a position and a target profit of each of I imaging targets and a satellite portion to obtain orbit information about each of J satellites and transmit the obtained orbit information to the ground station, wherein the ground station includes a calculator for calculating an available time for imaging and configured to calculate, with respect to an arbitrary satellite j (j∈J) from among the J satellites, K available times for imaging each including an available start time for imaging and an available end time for imaging with respect to an arbitrary imaging target (i, i∈I) from among the I imaging targets, a calculator for calculating a posture maneuverability time and configured to calculate, with respect to an arbitrary first imaging target i and an arbitrary second imaging target i' from among the I imaging targets, a posture maneuverability time of the arbitrary satellite j for maneuvering from a first satellite posture for imaging the arbitrary first imaging target i to a second satellite posture for imaging the arbitrary second imaging target i', an obtainer for obtaining a consecutive imaging result and configured to obtain, with respect to the arbitrary first imaging target i and the arbitrary second imaging target i' from among the I imaging targets, a result of availability of consecutive imaging between the arbitrary first imaging target i and the arbitrary second imaging target i', based on a $k^{th}$ available time for imaging from among the K available times for imaging calculated with respect to the arbitrary first imaging target i and the posture maneuverability time of the arbitrary satellite j, a generator for generating a candidate imaging sequence and configured to generate, based on the result of availability of the consecutive imaging between the arbitrary first imaging target i and the arbitrary second imaging target i' from among the I imaging targets, a plurality of candidate imaging sequences including at least two arbitrary imaging targets (i, i∈I) from among the I imaging targets, a calculator for calculating an imaging sequence profit and configured to calculate a plurality of imaging sequence profits from the plurality of candidate imaging sequences, respectively, by using a pre-defined optimization objective function, and a determining portion for determining an optimal imaging sequence to determine, as an optimal imaging sequence, a set of at least two arbitrary imaging targets (i, i∈I) from among the I imaging targets, included in a candidate imaging sequence having a largest imaging sequence profit of the plurality of imaging sequence profits, and the satellite portion includes a target image capturing portion to receive the optimal imaging sequence and capture a target image according to the optimal imaging sequence.

According to another aspect of the disclosure, an apparatus for generating an optimal imaging sequence for a plurality of satellites includes a core module to generate output data including an optimal imaging sequence for a plurality of satellites by using a plurality of pieces of input data received from a user and orbit propagation data received from satellite operating software (a systems tool kit (STK)) and a data management module to store the plurality of pieces of input data, the orbit propagation data, and the output data and perform transmission and reception with respect to the data, wherein the core module is configured to receive a position and a target profit of each of I imaging targets as target data from among the plurality of pieces of input data, receive, from the satellite operating software, the orbit propagation data including orbit information about each of J satellites and K available times for imaging each including an available start time for imaging and an available end time for imaging with respect to an arbitrary imaging target (i, i∈I) from among the I imaging targets with respect to an arbitrary satellite j (j∈J) from among the J satellites, with respect to an arbitrary first imaging target i and an arbitrary second imaging target i' from among the I imaging targets, calculate a posture maneuverability time of the arbitrary satellite j for maneuvering from a first satellite posture for imaging the arbitrary first imaging target i to a second satellite posture for imaging the arbitrary second imaging target i', with respect to the arbitrary first imaging target i and the arbitrary second imaging target i' from among the I imaging targets, obtain a result of availability of consecutive imaging between the arbitrary first imaging target i and the arbitrary second imaging target i' based on a $k^{th}$ available time for imaging from among the K available times for imaging calculated with respect to the arbitrary first imaging target i and the posture maneuverability time of the arbitrary satellite j, based on the result of availability of the consecutive imaging between the arbitrary first imaging target i and the arbitrary second imaging target i' from among the I imaging targets, generate a plurality of candidate imaging sequences including at least two arbitrary imaging targets (i, i∈I) from among the I imaging targets, calculate a plurality of imaging sequence profits from the plurality of candidate imaging sequences, respectively, by using a pre-defined optimization objective function, and determine, as an optimal imaging sequence, a set of at least two arbitrary imaging targets (i, i∈I) from among the I imaging targets, included in a candidate imaging sequence having a largest imaging sequence profit of the plurality of imaging sequence profits.

The apparatus may further include an external interface module to receive, from the satellite operating software (STK), the orbit propagation data generated based on the target data, satellite data, and ground station data from among the plurality of pieces of input data and transmit the received orbit propagation data to the data management module, a visualization module to generate result visualization data by analyzing result data including the optimal imaging sequence, according to objective result data desired by the user from among the plurality of pieces of input data, and a user interface module to receive the plurality of pieces of input data from the user and provide the result visualization data generated based on the plurality of pieces of input data to the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
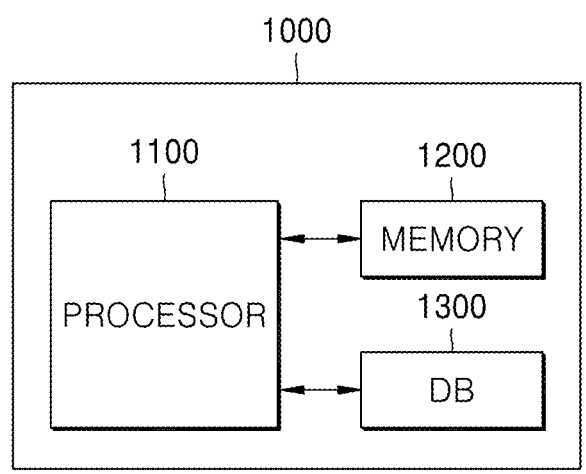
FIG. 1 is a schematic block diagram of a computing device for performing a method of generating an optimal imaging sequence for a plurality of satellites, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Embodiments will be described in detail below with reference to the accompanying drawings.

Before describing the disclosure in detail, it shall be noted that the terms or words used in this specification shall not be unconditionally interpreted as being limited to common or lexical meanings and the applicant of the disclosure can appropriately define and use the concept of various terms in order to describe his or her disclosure in the best way. Furthermore, it is to be understood that these terms or words shall be interpreted as the meanings and concepts according to the technical concept of the disclosure. That is, the terms used herein are only to describe embodiments of the disclosure and are not intended to limit the content of the disclosure in detail. These terms should be understood as the terms defined by taking into account various possibilities of the disclosure.

In this specification, an expression of a singular meaning may also indicate a plural meaning unless apparently indicated otherwise contextually. Similarly, it should be understood that an expression of a plural meaning may also indicate a singular meaning.

Throughout the specification, when an element is referred to as being "connected" to another element, the element may be "directly connected" to the other element or may be "indirectly connected" to the other element with another element therebetween. When an element "includes" another element, unless it is specifically mentioned otherwise, the element may further include, in addition to the other element, yet another element, rather than excluding the yet another element.

Also, the terms "first," "second," etc. used in the detailed description, the claims, and the drawings of the disclosure are intended to distinguish similar objects from one another and are not intended to indicate a particular order or a pre-post order.

In addition, in this specification of the disclosure, the term " . . . portion," " . . . device," "module," "apparatus," or the like denotes, when used, a unit capable of processing one or more functions or operations. It should be understood that the functions or operations may be realized by hardware, software, or a combination of hardware and software.

Hereinafter, when describing the disclosure, the configurations, for example, well-known techniques including the related art, which are determined to have the possibility of unnecessarily blurring the gist of the disclosure, may not be described in detail.

FIG. 1 is a schematic block diagram of a computing device 1000 for performing a method of generating an optimal imaging sequence for a plurality of satellites, according to an embodiment.

Referring to FIG. 1, the computing device 1000 may include a processor 1100, a memory 1200, and a database (DB) 1300.

The processor 1100 may control operations of the computing device 1000 in general. The processor 1100 may be configured to process a command of a computer program by performing basic arithmetic, logic, and input and output operations. By using a pre-defined optimization objective function, the processor 1100 may calculate an imaging sequence profit with respect to each of candidate imaging sequences of a satellite, according to an embodiment. The processor 1100 may receive data stored in the memory 1200 and the DB 1300 and transmit data to the memory 1200 and the DB 1300.

The memory 1200 may be a recording medium readable by the computing device 1000 and may include random-access memory (RAM), read-only memory (ROM), and a permanent mass storage device such as a disk drive.

The memory 1200 may store a program code for generating an optimal imaging sequence for a plurality of satellites, data necessary to execute the program code and data generated in a process of executing the program code, according to an embodiment. The program code may include a genetic algorithm (GA), particle swarm optimization (PSO), and a dynamics programming (DP) algorithm code. The memory 1200 may store the pre-defined optimization objective function.

The DB 1300 may be a recording medium readable by the processor 1100 and may include a permanent mass storage recording device such as a disk drive. The DB 1300 may store data necessary to execute the method of generating the optimal imaging sequence for the plurality of satellites, according to an embodiment. For example, the DB 1300 may store a pre-set weight value a selected by performing a plurality of simulations. The DB 1300 may store data necessary to perform the method of generating the optimal imaging sequence, such as the total number of satellites, the total number of imaging targets, a target profit of each of a plurality of imaging targets, a degree of significance and a degree of imaging urgency of each imaging target, a minimum number of imaging operations and a maximum number of imaging operations pre-set for each imaging target, an available time for imaging for each imaging target, possessed by a plurality of satellites, and a maneuverability angular velocity and a posture stabilization time of each satellite. At least some of the data necessary to perform the method of generating the optimal imaging sequence, according to an embodiment, may be stored in the memory 1200.

According to an embodiment, in addition to the processor 1100, the memory 1200, and the DB 1300, the computing device 1000 may further include a communication module, an input and output device, a storage device, or the like. For example, the computing device 1000 may receive, through the communication module, status information and orbit information with respect to each of the plurality of satellite and position information of each of the plurality of imaging targets An operation of the processor 1100 according to an embodiment will be described in more detail below.

Figure 2:
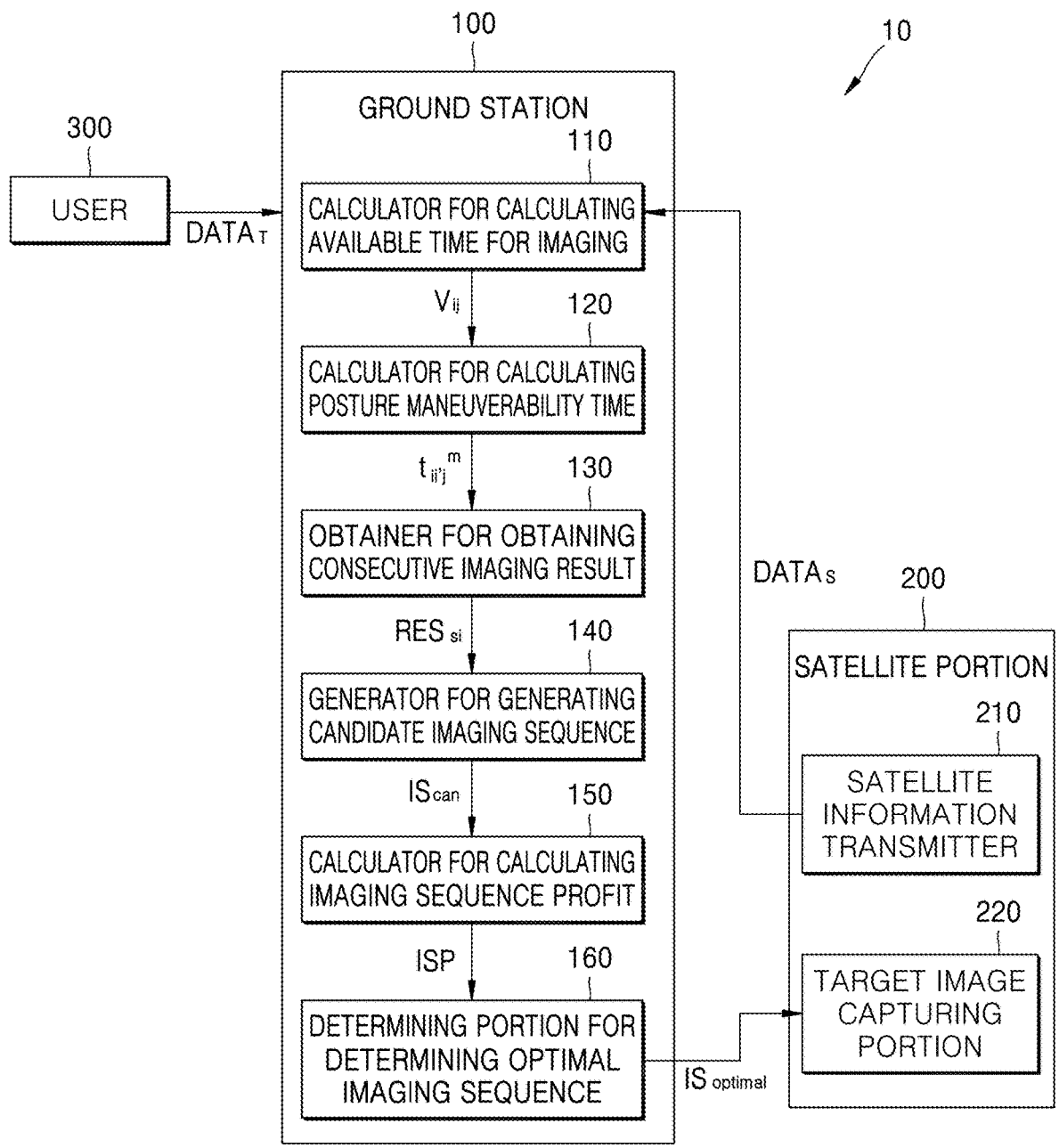
FIG. 2 is a schematic block diagram of an optimal imaging sequence system for a plurality of satellites, according to an embodiment.

FIG. 2 is a schematic block diagram of an optimal imaging sequence system 10 for a plurality of satellites, according to an embodiment.

Referring to FIG. 2, the optimal imaging sequence system 10 for the plurality of satellites may include a ground station 100 and a satellite portion 200. The optimal imaging sequence system 10 may further include a user 300 transmitting, to the ground station 100, data $DATA_T$ about positions of a plurality of imaging targets and a target profit of each imaging target and requesting the satellites to perform an imaging mission. The request of the user 300 may include various parameters for a satellite mission plan. The parameters may be related to the target profit of the imaging target and may include a degree of significance of the target and a degree of imaging urgency of the target. The target profit may be calculated according to a pre-set weight value a indicating a balance rate of the degree of significance of the target and the degree of urgency of the target.

The ground station 100 may include a calculator for calculating an available time for imaging 110, a calculator for calculating a posture maneuverability time 120, an obtainer for obtaining a consecutive imaging result 130, a generator for generating a candidate imaging sequence 140, a calculator for calculating an imaging sequence profit 150, and a determining portion for determining an optimal imaging sequence 160.

The calculator for calculating the available time for imaging 110 may calculate K available times $V_{ij}$ for imaging each including an available start time for imaging and an available end time for imaging with respect to an arbitrary imaging target (i, i∈I) from among I imaging targets, with respect to an arbitrary satellite j (j∈J) from among J satellites. The calculator for calculating the available time for imaging 110 may transmit information about the calculated K available times $V_{ij}$ for imaging to the calculator for calculating the posture maneuverability time 120.

With respect to an arbitrary first imaging target i and an arbitrary second imaging target i' from among the I imaging targets, the calculator for calculating the posture maneuverability time 120 may calculate a posture maneuverability time $t^m_{ii'j}$ of the satellite j for maneuvering from a first satellite posture for imaging the first imaging target i to a second satellite posture for imaging the second imaging target i'. The calculator for calculating the posture maneuverability time 120 may transmit the calculated posture maneuverability time $t^m_{ii'j}$ of the satellite to the obtainer for obtaining the consecutive imaging result 130.

With respect to the arbitrary first imaging target i and the arbitrary second imaging target i' from among the I imaging targets, the obtainer for obtaining the consecutive imaging result 130 may obtain a result $RES_{SI}$ of the availability of consecutive imaging between the first imaging target i and the second imaging target i', based on a $k^{th}$ available time for imaging from among the calculated K available times $V_{ij}$ for imaging calculated with respect to the first imaging target I, and the posture maneuverability time $t^m_{ii'j}$ of the satellite j. The obtainer for obtaining the consecutive imaging result 130 may transmit the obtained result $RES_{SI}$ of the availability of consecutive imaging between the imaging targets to the generator for generating the candidate imaging sequence 140.

Based on the result $RES_{SI}$ with respect to the consecutive imaging between the arbitrary first imaging target i and the arbitrary second imaging target i' from among the I imaging targets, the generator for generating the candidate imaging sequence 140 may generate a plurality of candidate imaging sequences $IS_{can}$ including at least two arbitrary imaging targets (i, i∈I) from among the I imaging targets. The generator for generating the candidate imaging sequence 140 may transmit the generated plurality of candidate imaging sequences $IS_{can}$ to the calculator for calculating the imaging sequence profit 150.

The calculator for calculating the imaging sequence profit 150 may use a pre-defined optimization objective function to calculate a plurality of imaging sequence profits ISP respectively from the plurality of candidate imaging sequences $IS_{can}$. The calculator for calculating the imaging sequence profit 150 may transmit the calculated plurality of imaging sequence profits ISP to the determining portion for determining the optimal imaging sequence 160.

The determining portion for determining the optimal imaging sequence 160 may determine a set of at least two arbitrary imaging targets (i, i∈I) from among the I imaging targets, the at least two arbitrary imaging targets being included in a candidate imaging sequence having the largest imaging sequence profit of the plurality of imaging sequence profits ISP, as an optimal imaging sequence $IS_{optimal}$. The determining portion for determining the optimal imaging sequence 160 may determine the optimal imaging sequence $IS_{optimal}$ after generating the candidate imaging sequences $IS_{can}$ with respect to all of the plurality of satellites (for example, the J satellites), according to an embodiment. The determining portion for determining the optimal imaging sequence 160 may transmit the optimal imaging sequence to a target image capturing portion 220 of the satellite portion 200. The determining portion for determining the optimal imaging sequence 160 may establish an optimal imaging mission plan according to the optimal imaging sequence $IS_{optimal}$.

The satellite portion 200 may include a satellite information transmitter 210 and the target image capturing portion 220.

The satellite information transmitter 210 may obtain and transmit, to the ground station 100, data DATAs about a satellite status and a satellite orbit. The target image capturing portion 220 may receive the optimal imaging sequence $IS_{optimal}$ from the determining portion for determining the optimal imaging sequence 160 of the ground station 100 and may capture a target image according to the optimal imaging sequence $IS_{optimal}$. The target image capturing portion 220 may receive the optimal imaging mission plan from the determining portion for determining the optimal imaging sequence 160 and may capture the target image according to the optimal imaging mission plan.

Figure 3:
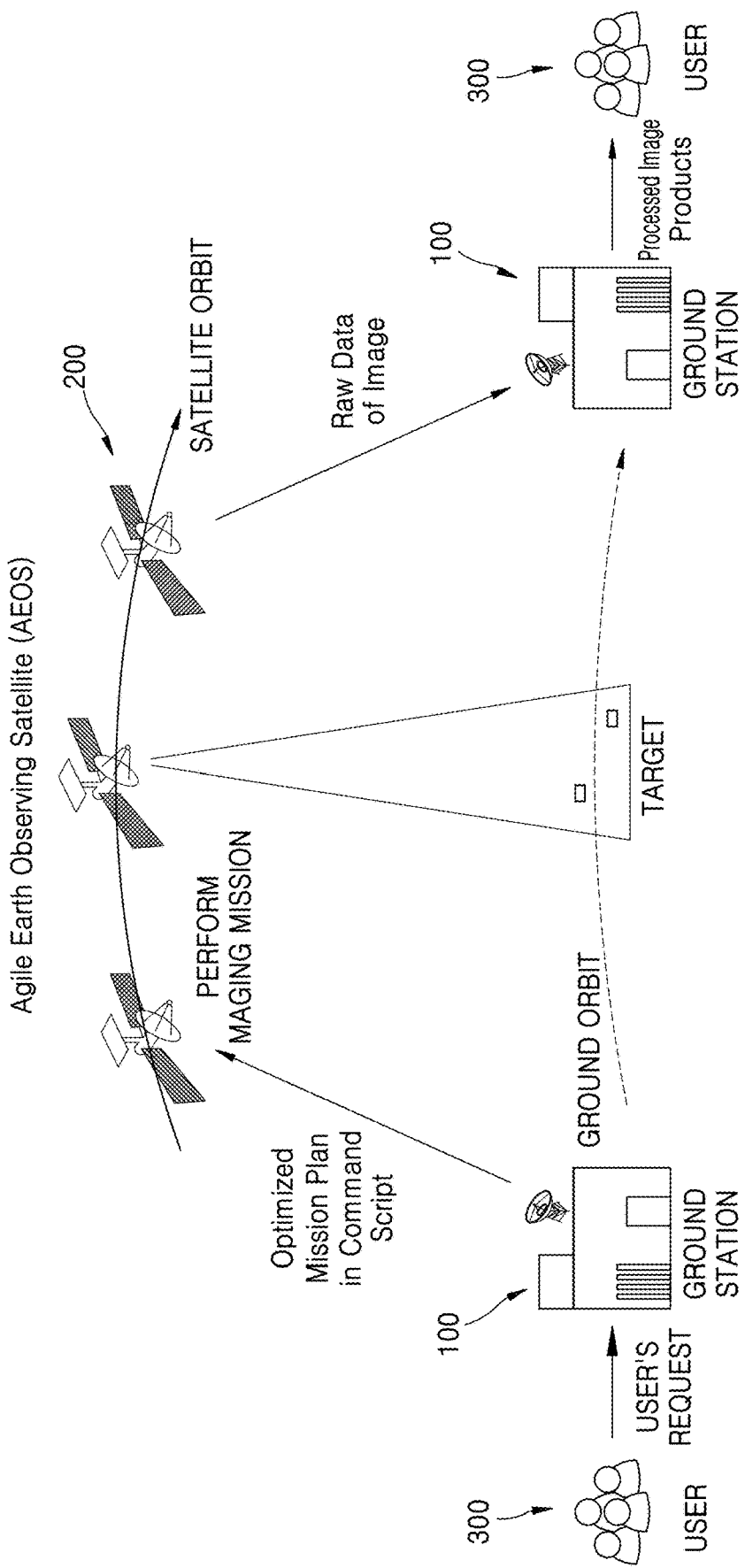
FIG. 3 is a schematic conceptual diagram of the performance of an imaging mission by a plurality of satellites, according to an embodiment.

FIG. 3 is a schematic conceptual diagram of the performance of an imaging mission by a plurality of satellites, according to an embodiment. FIG. 3 illustrates the entire process of the performance of a ground target imaging mission by a plurality of ground observation satellites.

The ground station 100 may perform all controlling and managing operations including scheduling of a mission of the satellite portion 200 launched from the ground. The ground station 100 may receive a mission performance request from the user 300 and perform mission scheduling by receiving information about a satellite orbit, a satellite posture correction, etc. according to necessity with respect to the operation of the satellite portion 200. For example, when the user 300 requests a certain image from the ground station 100, the ground station 100 may establish an optimized mission plan based on the request by the user 300 and the orbit information about the available satellite portion 200. The optimized mission plan may be transmitted to the satellite portion 200 as a command script, and the satellite portion 200 may perform the mission according to the mission plan. According to an embodiment, the satellite portion 200 may include a camera and may capture an image according to the request by the user 300. Also, the ground station 100 may receive the image from the satellite portion 200. In order to obtain an image with respect to a ground target by using the camera equipped in the satellite 200, a satellite image management system may plan and perform a mission of capturing an image and a mission of imaging a ground target for receiving the captured image in the ground. Raw image data obtained by the satellite portion 200 may be downlinked to the ground station 100 and processed by the ground station 100, and the user 300 may use the processed image data.

Figure 4A:
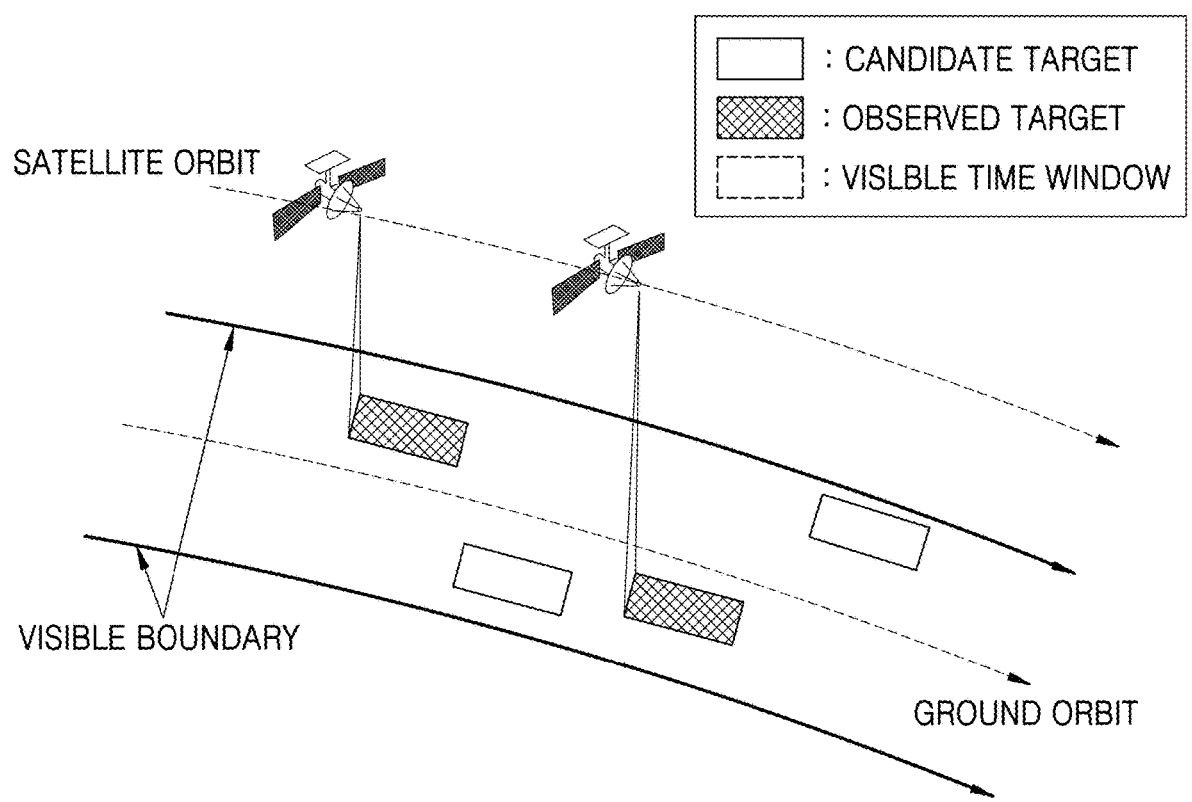
FIG. 4A is a schematic conceptual diagram of a ground target imaging operation by a satellite in an earth observation satellite system, according to an embodiment.

FIG. 4A is a schematic conceptual diagram of a ground target imaging operation by a satellite in an earth observation satellite system, according to an embodiment.

FIG. 4A illustrates a conceptual diagram of a ground target imaging operation by a previous earth observation satellite (EOS) or non agile satellite. In response to a request for observation, the EOS may obtain, on a satellite orbit, an image of a target on a ground orbit. For example, the EOS may observe and monitor the earth surface, the air, and other geophysical parameters. The EOS may provide various sensors and devices for capturing data throughout various wavelengths of electromagnetic spectrums including visible rays, infrared rays, and microwaves. The EOS may gather information with respect to natural resources, climatic patterns, the weather system, the surface of the earth, maritime conditions, and other environmental factors, and thus, may provide the important data for scientific researches, environment monitoring, disaster countermeasures, climatic studies, and other various application fields.

Figure 4B:
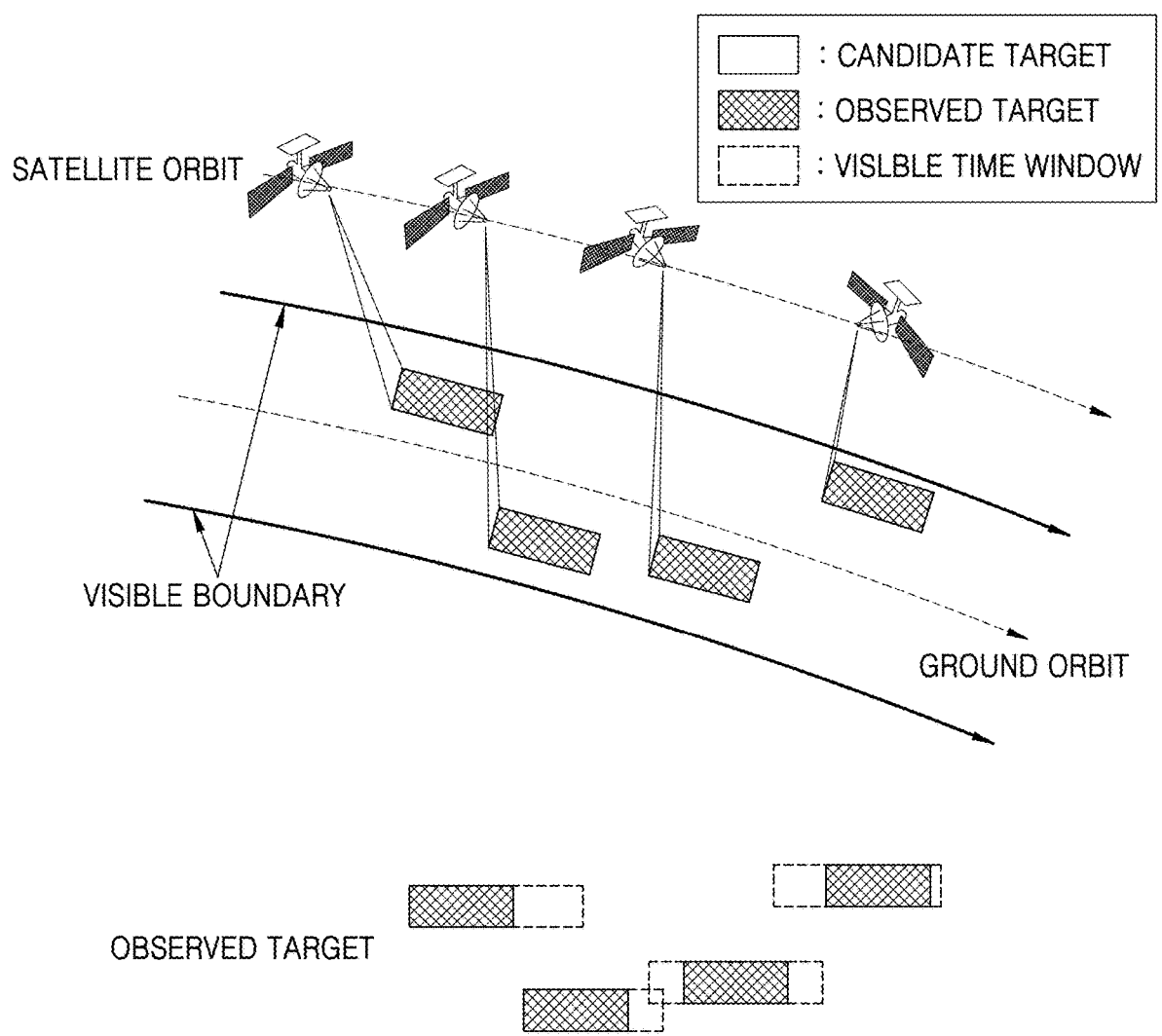
FIG. 4B is a schematic conceptual diagram of a ground target imaging operation by a satellite in an earth observation satellite system, according to an embodiment.

FIG. 4B is a schematic conceptual diagram of a ground target imaging operation by a satellite in an earth observation satellite system, according to an embodiment. FIG. 4B illustrates a conceptual diagram of a ground target imaging operation by an agile earth observation satellite (AEOS) or agile satellite, according to an embodiment. The AEOS may be a type of satellite designed to adapt to an imaging function with a high degree of maneuverability. Unlike the previous EOS (FIG. 4A) based on a fixed orbit and a fixed imaging pattern, the AEOS may change a capturing direction of a camera, a frequency of revisiting a certain area, and imaging parameters, according to requirements of a certain user or changing operational requirements. The AEOS is equipped with a high-level posture control system and capturing device, and thus, may quickly rearrange sensors and adjust the imaging parameters to rapidly cope with the natural disasters, environmental changes, or emergency situations and perform observation. Due to this characteristic of the AEOS, the AEOS may perform an especially important role in the application fields of, for example, disaster management, environmental monitoring, agriculture, city planning, and national defense surveillance. The AEOS has greater flexibility and a higher response rate than the previous EOS and has the capability to efficiently collect data in various running scenarios.

With reference to FIGS. 4A and 4B, compared with the previous EOS (FIG. 4A) capable of manipulation only in a roll axis, the AEOS (FIG. 4B) may perform manipulation simultaneously in a roll axis and a pitch axis to have an increased visible time window (VTW). A satellite may capture an image of a ground target on a satellite orbit for a predetermined period referred to as a VTW. The VTW may be affected by various factors including an orbit of a satellite, a position of the satellite with respect to the sun, and regions under observation. Generally, a VTW may indicate a time period during which a sensor or a device of a satellite may capture an image or data of a visible ray spectrum when the satellite passes by a predetermined location of the earth. Although not shown in FIGS. 4A and 4B, an observation window (OW) may indicate a time required for observation. Due to the agility of a satellite, the VTW may be greater than the OW with respect to observation of each target and the OW may have to be determined within the VTW. Based on this, the efficiency of the entire system may be increased, and thus, an increased number of targets may be observed within a given time period.

Referring to FIGS. 4A and 4B, the AEOS (FIG. 4B) may have an extended VTW than the EOS (FIG. 4A). Compared with the EOS (FIG. 4A) having a limited number of available satellites and obliged to complete a number of missions within a short time period, the AEOS (FIG. 4B) may observe a greater number of targets than the EOS in an environment in which an increased number of targets may be observed. For example, while in the case of the EOS of FIG. 4A, two satellites on the satellite orbit may observe two ground targets from among four ground target candidates, in the case of the AEOS of FIG. 4B, having the greater VTW than the EOS of FIG. 4A, four satellites on the satellite orbit may observe four ground targets. Thus, the degree of complexity of an imaging mission plan is greatly increased, and optimization through a numerical approach, rather than an analytical approach, may be effective.

Figure 5:
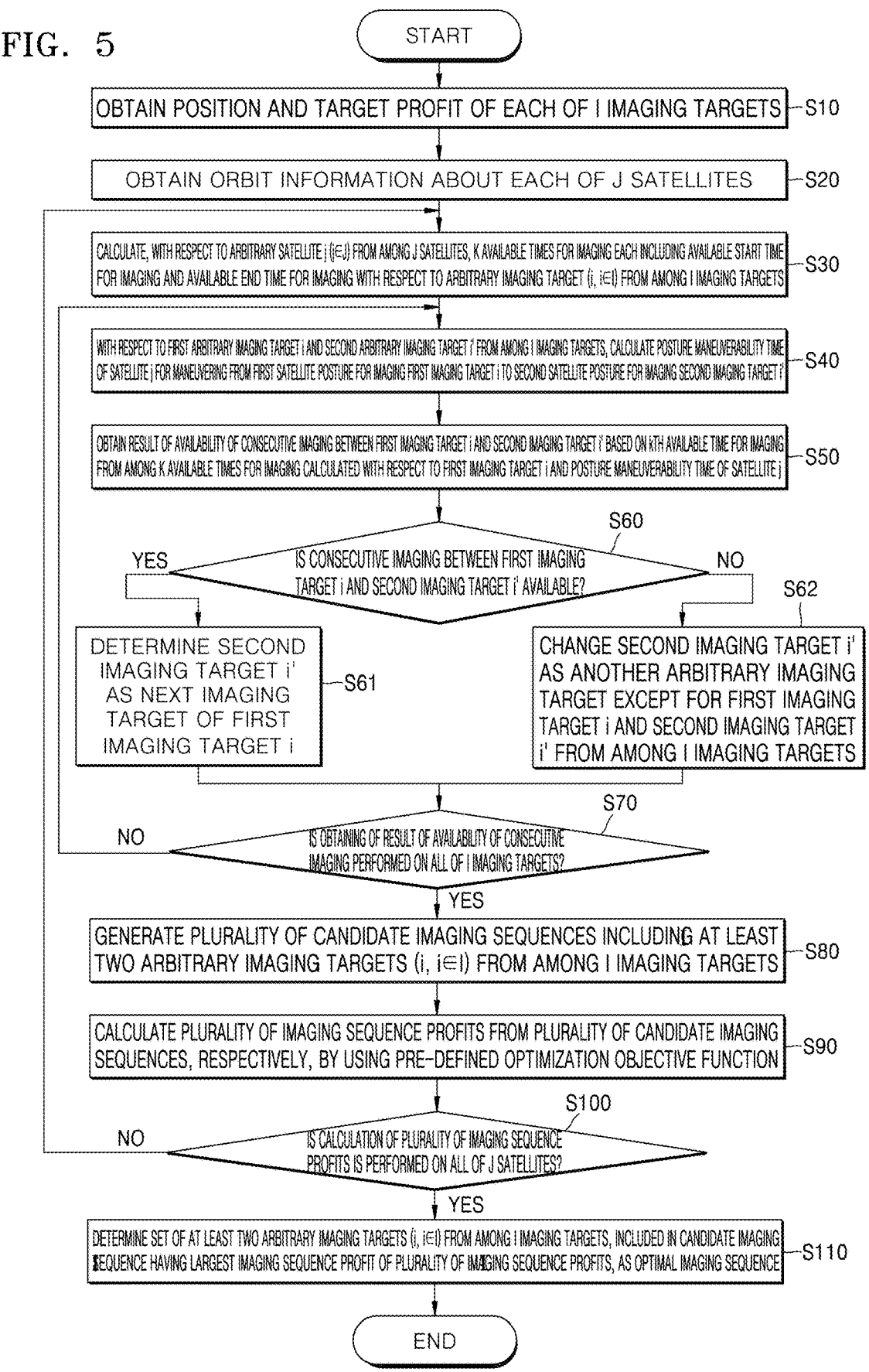
FIG. 5 is a flowchart of a method of generating an optimal imaging sequence for a plurality of satellites, according to an embodiment.

FIG. 5 is a flowchart of a method of generating an optimal imaging sequence for a plurality of satellites, according to an embodiment.

According to the method illustrated in FIG. 5, according to the disclosure, when a plurality of earth observation satellites image a plurality of ground targets, all imaging sequences capable of consecutive target imaging may be calculated, and an optimal imaging sequence having the largest sum of target profits from among all of the imaging sequences may be generated. Also, according to the optimal imaging sequence, the ground station may establish an optimal imaging mission plan and the satellite may capture a target image according to the optimal imaging mission plan.

The ground station may obtain a position and a target profit of each of I imaging targets in operation S10. The imaging target may be an object on the ground orbit, which is to be imaged. For example, there may be two or more imaging targets. The target profit of each imaging target may be calculated based on a degree of significance of the imaging target, a degree of imaging urgency of the imaging target, and a pre-set weight value. For example, a target profit $p_i$ of an arbitrary first imaging target i of the I imaging targets may be calculated as $p_i = a \times s_i + (1-a) u_i$. Here, $s_i$ may be a value indicating the degree of significance of the first imaging target i, $u_i$ may be a value indicating the degree of imaging urgency of the first imaging target i, and a may be a pre-set weight value which is between 0 and 1.

The ground station may obtain orbit information about each of J satellites in operation S20. For example, the orbit information about the satellite may include a position of the satellite, a status of the satellite, and an orbit of the satellite. The ground station may calculate K available times for imaging each including an available start time for imaging and an available end time for imaging with respect to an arbitrary imaging target (i, i∈I) from among the I imaging targets, with respect to an arbitrary satellite j (j∈J) from among the J satellites, in operation S30. The available time for imaging may refer to the VTW described in FIGS. 4A and 4B.

With respect to the arbitrary first imaging target i and an arbitrary second imaging target i' from among the I imaging targets, the ground station may calculate a posture maneuverability time $t_{ii'j}^m$ of a satellite j for maneuvering from a first satellite posture for imaging the arbitrary first imaging target i to a second satellite posture for imaging the arbitrary second imaging target i', in operation S40. A conceptual diagram with respect to the calculation of the posture maneuverability time $t_{ii'j}^m$ of the satellite j will be described in more detail with reference to FIG. 6.

With respect to the arbitrary first and second imaging targets i and i' from among the I imaging targets, the ground station may obtain a result of availability of consecutive imaging between the first imaging target i and the second imaging target i', based on a $k^{th}$ available time for imaging from among K available times for imaging, calculated with respect to the first imaging target I, and the posture maneuverability time $t_{ii'j}^m$ of the satellite j, in operation S50.

The ground station may determine whether or not consecutive imaging is available between the first imaging target i and the second imaging target i', in operation S60. The determination with respect to availability of consecutive imaging between the imaging targets will be described in more detail with reference to FIG. 7. When it is determined as $t^s_{ijk} + t_{o_{ij}} + t_m^{ii'j} + t^s_j \leq t^s_{i'jk}$ in the determination of the availability of consecutive imaging between the imaging targets, that is, when the consecutive imaging is available between the first imaging target i and the second imaging target i', the second imaging target i' may be determined as the next imaging target of the first imaging target i, in operation S61. According to an embodiment, when it is determined as $t^s_{ijk} + t^o_{ij} + t^m_{ii'j} + t^s_j \leq t^s_{i'jk}$ in operation S50 in which the result of availability of consecutive imaging between the first imaging target i and the second imaging target i' is obtained, an imaging determination value $x_{ijk,t}$ of the satellite j with respect to the first imaging target i in a $t^{th}$ candidate imaging sequence from among T candidate imaging sequences of the satellite j may be set as 1. Here, $t^s_{ijk}$ may be an actual start time for imaging by the satellite j with respect to the first imaging target i within the $k^{th}$ available time for imaging from among the K available times for imaging possessed by the satellite j with respect to the first imaging target i, $t^s_{ijk}$ may be an actual start time for imaging by the satellite j with respect to the second imaging target i' within the $k^{th}$ available time $v_{jik}$ for imaging from among the K available times for imaging possessed by the satellite j with respect to the second imaging target i', $t^o_{ij}$ may be an imaging time by the satellite j with respect to the first imaging target i, $t^m_{ii'j}$ may be a posture maneuverability time for the satellite j to maneuver from a posture for imaging the first imaging target i to a posture for imaging the second imaging target i', and $t^s_j$ may be a posture stabilization time of the satellite j, which is a constant. When the imaging determination value $x_{ijk,t}$ is 1, it denotes that in the $t^{th}$ candidate imaging sequence of the satellite j, after the first imaging target 1 is imaged, the second imaging target i', which is an adjacent imaging target, may be consecutively imaged.

When it is determined that consecutive imaging is not available between the first imaging target i and the second imaging target i', the ground station may change the second imaging target i' to another arbitrary imaging target except for the first imaging target i and the second imaging target i' from among the I imaging targets, in operation S62. Here, the other changed arbitrary imaging target i" has to satisfy i"∈I (here, i"≠i, i"≠i'). According to an embodiment, when it is determined as $t^s_{ijk} + t^o_{ij} + t^m_{ii''j} + t^s_j > t^{si'jk}$ in operation 50 in which the result of availability of consecutive imaging between the first imaging target i and the second imaging target i' is obtained, the imaging determination value $x_{ijk,t}$ of the satellite j with respect to the first imaging target i in the $t^{th}$ candidate imaging sequence of the satellite j may be set as 0. When the imaging determination value $x_{ijk,t}$ is 0, it denotes that in the $t^{th}$ candidate imaging sequence of the satellite j, after the first imaging target i is imaged, consecutive imaging may not be performed with the second imaging target i', which is an adjacent imaging target.

The ground station may determine whether the determination with respect to the availability of consecutive imaging is performed on all of the I imaging targets, in operation S70. According to an embodiment, with respect to the arbitrary satellite j, a process of determining the availability of consecutive imaging between all of the I imaging targets has to be performed, and thus, the process of the determination according to operation S70 is required.

As a result of operation S70, when it is determined that the process of the determination is performed on all of the I imaging targets, the ground station may generate a plurality of candidate imaging sequences including at least two arbitrary imaging targets (i, i∈I) from among the I imaging targets, in operation S80. An imaging determination value of the satellite with respect to an arbitrary imaging target included in the candidate imaging sequences of an arbitrary satellite may be 1.

As a result of operation S70, when it is not determined that the process of the determination is performed on all of the I imaging targets, the ground station may perform operation S40 with respect to the arbitrary first imaging target i (i∈I) from among the I imaging targets. Thereafter, Operations S40 to S62 in which the availability of consecutive imaging between all of the I imaging targets is determined, may be performed.

The ground station may calculate a plurality of imaging sequence profits from the plurality of candidate imaging sequences, respectively, by using a pre-defined optimization objective function, in operation S90. The pre-defined optimization objective function may be $P_{j,t} = \sum_{i=1}^{I} \sum_{k=1}^{V_{ij}} p_i x_{ijk,t}$. According to an embodiment, in operation S90 in which T imaging sequence profits are calculated from the T candidate imaging sequences, respectively, with respect to an arbitrary satellite j (j∈J) from among J satellites, a $t^{th}$ imaging sequence profit Pit corresponding to the $t^{th}$ candidate imaging sequence from among the T imaging sequence profits may be calculated based on $P_{j,t} = \sum_{i=1}^{I} \sum_{k=1}^{V_{ij}} p_i x_{ijk,t}$. Here, I may be the total number of imaging targets, $p_i$ may be a target profit of the arbitrary first imaging target i from among the I imaging targets, $V_{ij}$ may be the number of available times for imaging with respect to the first imaging target i, and $x_{ijk,t}$ may be the imaging determination value of the satellite j with respect to the first imaging target i in the $t^{th}$ candidate imaging sequence. The imaging determination value $X_{ijk,t}$ of the satellite j with respect to the first imaging target i in the $t^{th}$ candidate imaging sequence may satisfy $N_i^{min} \leq \sum_{j=1}^{J} \sum_{k=1}^{V_{ij}} x_{ijk,t} \leq N_i^{max}$. Here, $N_i^{min}$ may be a pre-set minimum number of times of imaging of the first imaging target i and $N_i^{max}$ may be a pre-set maximum number of times of imaging of the first imaging target i.

The ground station may determine whether the generation of the plurality of candidate imaging sequences is performed with respect to all of the J satellites, in operation S100. According to an embodiment, a process of determining whether a plurality of candidate imaging sequences are generated with respect to all of the satellites has to be performed, and thus, the determination process according to operation S100 is required.

As a result of operation S100, when it is determined that the generation of the plurality of candidate imaging sequences is performed with respect to all of the J satellites, the ground station may determine a set of at least two arbitrary imaging targets (i, i∈I) from among the I imaging targets, included in a candidate imaging sequence having the largest imaging sequence profit of the plurality of imaging sequence profits, as an optimal imaging sequence, in operation S110. The largest imaging sequence profit P may be defined as P=max $(\Sigma_{j=1}^{J}\Sigma_{t=1}^{T}p_{j,t})$. The optimal imaging sequence according to an embodiment may include the arbitrary imaging targets (i, i∈I) from among the I imaging targets, for which the imaging determination value $x_{ijk,t}$ of the arbitrary satellite j (j∈J) in the $t^{th}$ candidate imaging sequence having the largest imaging sequence profit P from among the J satellites is 1.

As a result of operation S100, when it is not determined that the generation of the plurality of candidate imaging sequences is performed with respect to all of the J satellites, the ground station may perform operation S30 with respect to the arbitrary satellite j (j∈I) from among the J satellites. Thereafter, the ground station may perform operations S30 to S90 in which the candidate imaging sequences are generated with respect to all of the J satellites. A maximum available time Dt for imaging of the J satellites may be defined as $D_t=\Sigma_{j=1}^{J}\Sigma_{i=1}^{I}\Sigma_{k=1}^{J}V_{ij}^{o}t_{ij}^{o}x_{ijk,t}$. The maximum available time $D_t$ for imaging may satisfy $D_t \leq \Sigma_{j=1}^{J}d_j$ and here, $d_j$ may be the maximum available time for imaging of the satellite j.

Figure 6:
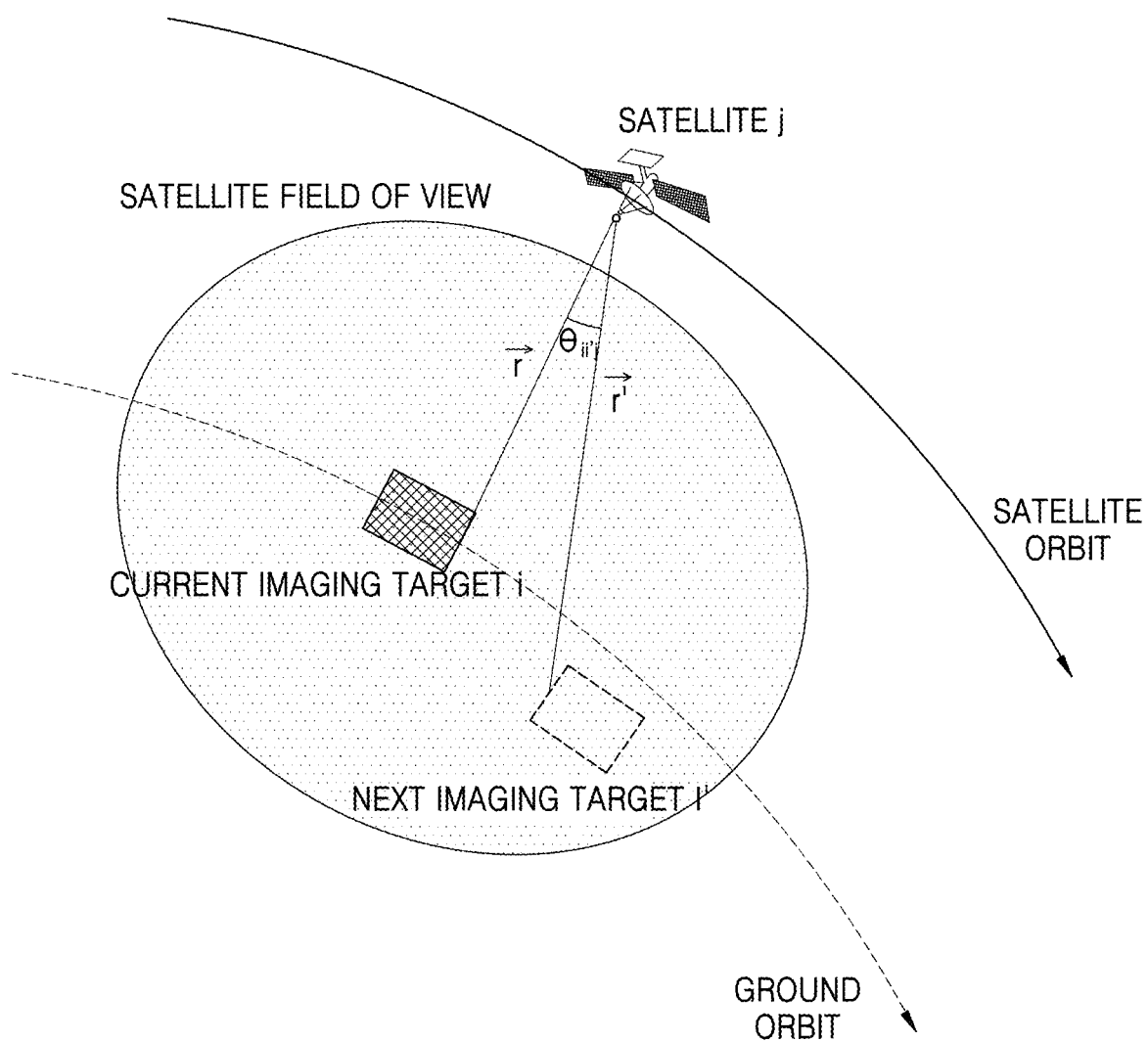
FIG. 6 is a conceptual diagram with respect to calculation of a posture maneuverability time of a satellite for consecutive target imaging, according to an embodiment.

FIG. 6 is a conceptual diagram with respect to calculation of a posture maneuverability time of a satellite for continual target imaging, according to an embodiment.

Referring to FIG. 6, a satellite may calculate a posture maneuverability time $t^m_{ii'j}$ of a satellite j for maneuvering from a satellite posture for imaging an arbitrary current imaging target i (i∈I) to a satellite posture for imaging an arbitrary next imaging target i' (i'∈I, here, i≠i') from among I imaging targets according to the disclosure. The satellite j may be positioned on a satellite orbit and may image an area within a satellite field of view including an imaging target (for example, the imaging target i and the imaging target i') on a ground orbit.

According to the disclosure, a significant parameter in orbit information about an AEOS may include a rotational angle for posture maneuverability of a satellite for consecutive target imaging. Referring to FIG. 6, when the satellite j observes the current imaging target i, the sight of the satellite j may be calculated based on a position of the current imaging target i. When the observation by the satellite j with respect to the current imaging target i is ended, and when the next imaging target i' from among the plurality of imaging targets is determined, the sight of the satellite j may be calculated based on a position of the next imaging target i'. Here, a posture maneuverability angle $\theta_{ii'j}$ of the satellite j for the satellite j to maneuver from a posture to image the current imaging target i to a posture to image the next imaging target i' may be an angle formed by a vector from the satellite j to the current imaging target i and a vector from the satellite j to the next imaging target i'. The posture maneuverability angle $\theta_{ii'j}$ of the satellite j may be defined as $$\theta_{ii'j} = \arccos(\vec{r} \cdot \vec{r'}).$$

Here, $$\vec{r}$$

may be a unit vector from the satellite j to the current imaging target i and $$\vec{r'}$$

may be a unit vector from the satellite j to the next imaging target i'. The posture maneuverability time $t^m_{ii'j}$ of the satellite may be calculated based on the posture maneuverability angle $\theta_{ii'j}$ of the satellite and a maneuverability angular velocity $\omega_j$ of the satellite. The posture maneuverability time $t^m_{ii'j}$ of the satellite j may be calculated based on $t^m_{ii'j}=\theta_{ii'j}/\omega_j$.

Figure 7:
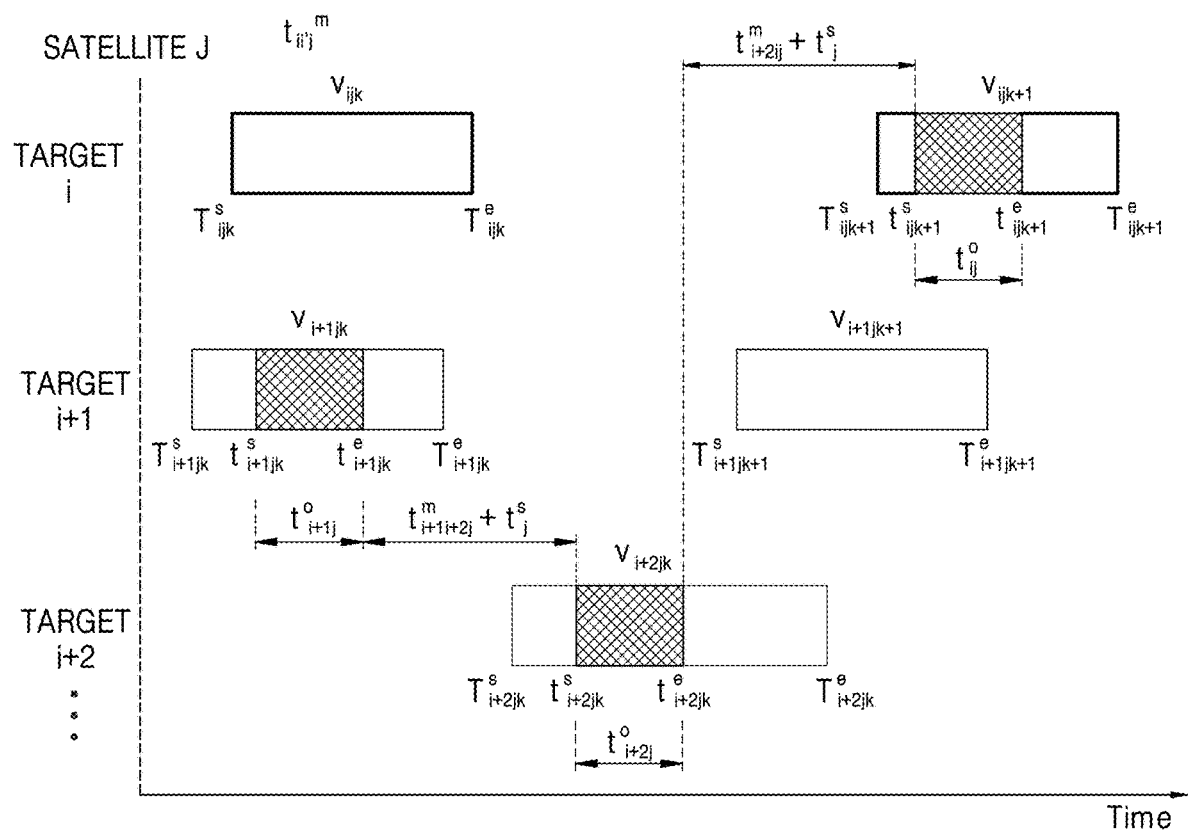
FIG. 7 is a chronological conceptual diagram with respect to an operation of determining whether or not consecutive imaging of a plurality of targets is available, according to an embodiment.

FIG. 7 is a chronological conceptual diagram with respect to an operation of determining whether or not consecutive imaging of a plurality of targets is available, according to an embodiment FIG. 7 illustrates an example of simulation in which an optimal imaging sequence is determined, by determining the availability of consecutive imaging among a plurality of ground targets based on restrictions for ground target imaging by the satellite. For example, the restrictions may include a target observation time of the satellite, a posture maneuverability time of the satellite, and a posture stabilization time of the satellite.

According to an embodiment, when the availability of consecutive imaging between the ground targets is determined, and when it is determined as $t^s_{i+1jk}+t^o_{i+1j}+t^m_{i+1i+2j}+t^s_j \leq t^s_{i+2jk}$ as illustrated in FIG. 7, the imaging target consecutively imaged next to a current imaging target i+1 may be a next imaging target i+2. Although not shown in FIG. 7, as another example, when it is determined as $t^s_{i+1jk}+t^o_{i+1j}+t^m_{i+1i+2j}+t^s_j>t^s_{i+2jk}$, the imaging target consecutively imaged next to the current imaging target i+1 may not be the imaging target i+2, and the availability of consecutive imaging may be determined with respect to another target adjacent to the current imaging target i+1. Here, $t^s_{i+1jk}$ may be an actual start time for a satellite j to image the imaging target i+1 during a $k^{th}$ available time for imaging from among K available times for imaging possessed by the satellite j with respect to the imaging target i+1, $t^s_{i+2jk}$ may be an actual start time for the satellite j to image the imaging target i+2 during the $k^{th}$ available time for imaging from among the K available times for imaging possessed by the satellite j with respect to the imaging target i+2, $t^o_{i+1j}$ may be an imaging time of the satellite j with respect to the imaging target i+1, $t^m_{i+1i+2j}$ may be a posture maneuverability time for the satellite j to maneuver from a posture for imaging the imaging target i+1 to a posture for imaging the imaging target i+2, and $t^s_j$ may be a posture stabilization time of the satellite j.

As illustrated in FIG. 7, a ground target assigned to each satellite j may have a unique VTW ($V_{ijk}$ of FIG. 7), and the satellite j may have to perform ground target imaging within the VTW ($V_{ijk}$ of FIG. 7) of each ground target (for example, i, i+1, i+2, . . . or the like). For example, according to an order of the VTW illustrated in FIG. 7, the target i may have to be imaged after the target i+1 according to the VTW time order. However, due to the posture maneuverability time of the satellite and the posture stabilization time of the satellite, the imaging target next to the target i+1 may be determined to be the imaging target i+2 rather than the imaging target i.

The restrictions of the satellite for the ground target imaging may include conditions about the available time ($v_{ijk}$ of FIG. 7) for imaging of the satellite with respect to a target, an actual start time for imaging, and an actual end time for imaging. The actual start time $t^s_{ijk}$ for imaging of the satellite j within the $k^{th}$ available time for imaging possessed by the satellite j with respect to the imaging target i may have to be behind or on a par with an available start time for imaging within the $k^{th}$ available time for imaging, and thus, may have to satisfy $T^s_{ijk} \leq t^s_{ijk}$. An actual end time for imaging of the satellite j with respect to the imaging target i within the $k^{th}$ available time for imaging may be calculated by adding the target imaging time $t^o_{ij}$ of the satellite j to the actual start time $t^s_{ijk}$ for imaging, and thus, may be defined as $t^s_{ijk}+t^o_{ij}$. $t^s_{ijk}+t^o{ij}$ may have to be before or on a par with an available end time $T^e_{ijk}$ for imaging within the $k^{th}$ available time for imaging, and thus, may have to satisfy $t^s_{ijk}+t^o_{ij} \leq T^e_{ijk}$.

Figure 8A:
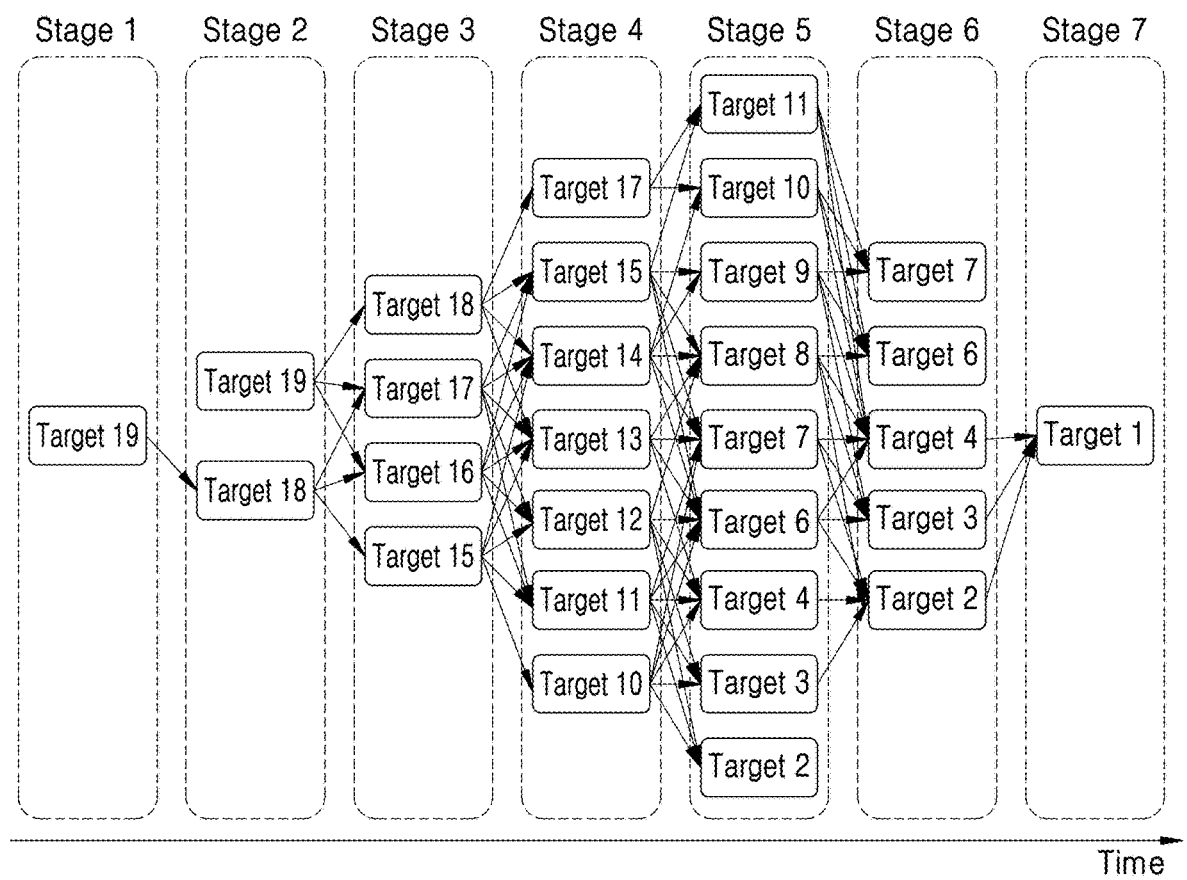
FIG. 8A illustrates operations indicating an example of a result of performing a method of generating an optimal imaging sequence for a satellite, according to an embodiment.

FIG. 8A illustrates an example of a result of simulation according to an embodiment and shows a result of performing a method of generating an optimal imaging sequence with respect to 20 imaging targets for one satellite (for example, a satellite j) during a day. According to the simulation, a planning period for generating the optimal imaging sequence may be the total of 7 days, and a roll angle/pitch angle of the satellite may be set in a range of about −30° at the least to about 30° at the most. An imaging time $t^o_{ij}$ of the satellite j with respect to an imaging target i may be 15 (s), a posture stabilization time $t^s_j$ of the satellite may be 5 (s), a maneuverability angular velocity wj of the satellite may be 3 (deg/s), a maximum available time for imaging $d_j$ of the satellite j may be 300 (s), a pre-set minimum number of times $N_i^{min}$ of imaging of the imaging target i and a pre-set maximum number of times $N_i^{max}$ of imaging of the imaging target i may be each once, and a pre-set weight value a may be 0.7. Each of a degree of significance si of the imaging target i and a degree of imaging urgency $u_i$ of the imaging target i may be any one of 0.3, 0.6, and 0.9.

FIG. 8A illustrates the example of the result of performing the method of generating the optimal imaging sequence for the satellite, according to an embodiment, the example being illustrated as operations. Referring to FIG. 8A, starting with a nineteenth imaging target from among the total of 20 imaging targets, availability of consecutive imaging between the imaging targets may be determined, according to FIG. 6, and candidate imaging sequences linking the imaging targets for which consecutive imaging is available may be generated. Here, for a fifth imaging target and a twentieth imaging target from among the 20 imaging targets, consecutive imaging is not available at any execution stage during the planning period, and thus, it may be identified that the fifth imaging target and the twentieth imaging target are not included in any of the generated candidate imaging sequences. This aspect will be described in more detail with reference to FIG. 8B.

Figure 8B:
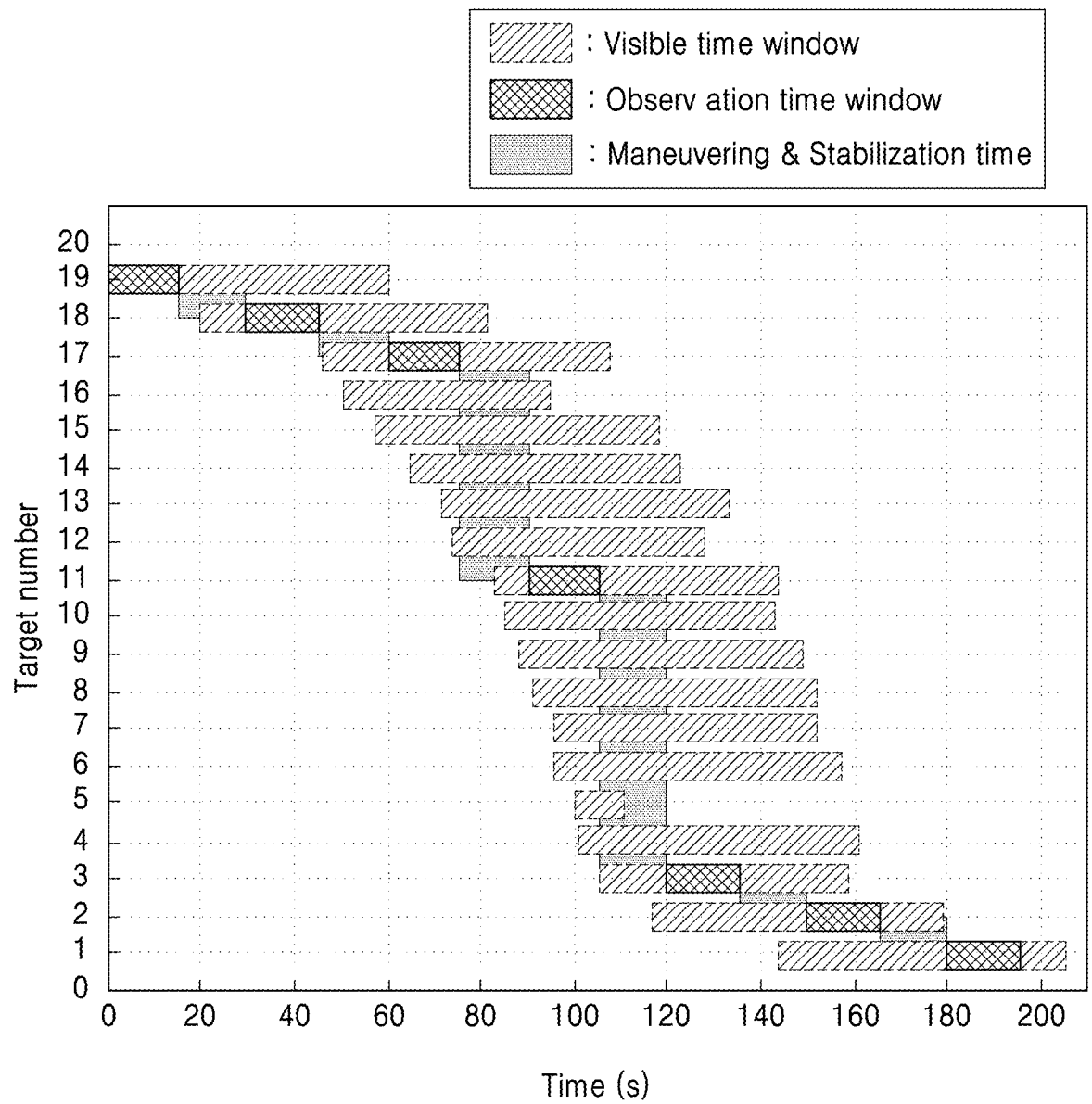
FIG. 8B illustrates an available time for imaging with respect to each of targets to indicate an example of a result of performing a method of generating an optimal imaging sequence for a satellite, according to an embodiment.

FIG. 8B illustrates an example of a result of performing a method of generating an optimal imaging sequence for a satellite, according to an embodiment, the example being illustrated as an available time for imaging with respect to each of targets. An imaging sequence for determining an imaging order of the targets may be generated based on information about a VTW, an OTW, a posture maneuvering time of the satellite, and a posture stabilization time of the satellite illustrated in FIG. 8B. Referring to FIG. 8B, in the case of the fifth imaging target, while the VTW is being generated, due to the posture maneuvering time and the posture stabilization time of the satellite, an observation time required for the fifth imaging target may not be secured, and thus, the fifth imaging target may not be included in the candidate imaging sequences as illustrated in FIG. 8A. Likewise, the twentieth imaging target may not approach the imaging sequence during the planning period based on the simulation, and thus, the twentieth imaging target may not be included in the candidate imaging sequences as illustrated in FIG. 8A. Referring to FIG. 8B, regarding the time-sequential imaging order of the targets according to the imaging sequence generated based on the result of the simulation, the OTW may be aligned based on the stated order of the nineteenth imaging target, an eighteenth imaging target, a seventeenth imaging target, an eleventh imaging target, a third imaging target, a second imaging target, and a first imaging target, and the imaging sequence may be generated based on the aligned OTW.

Figure 9:
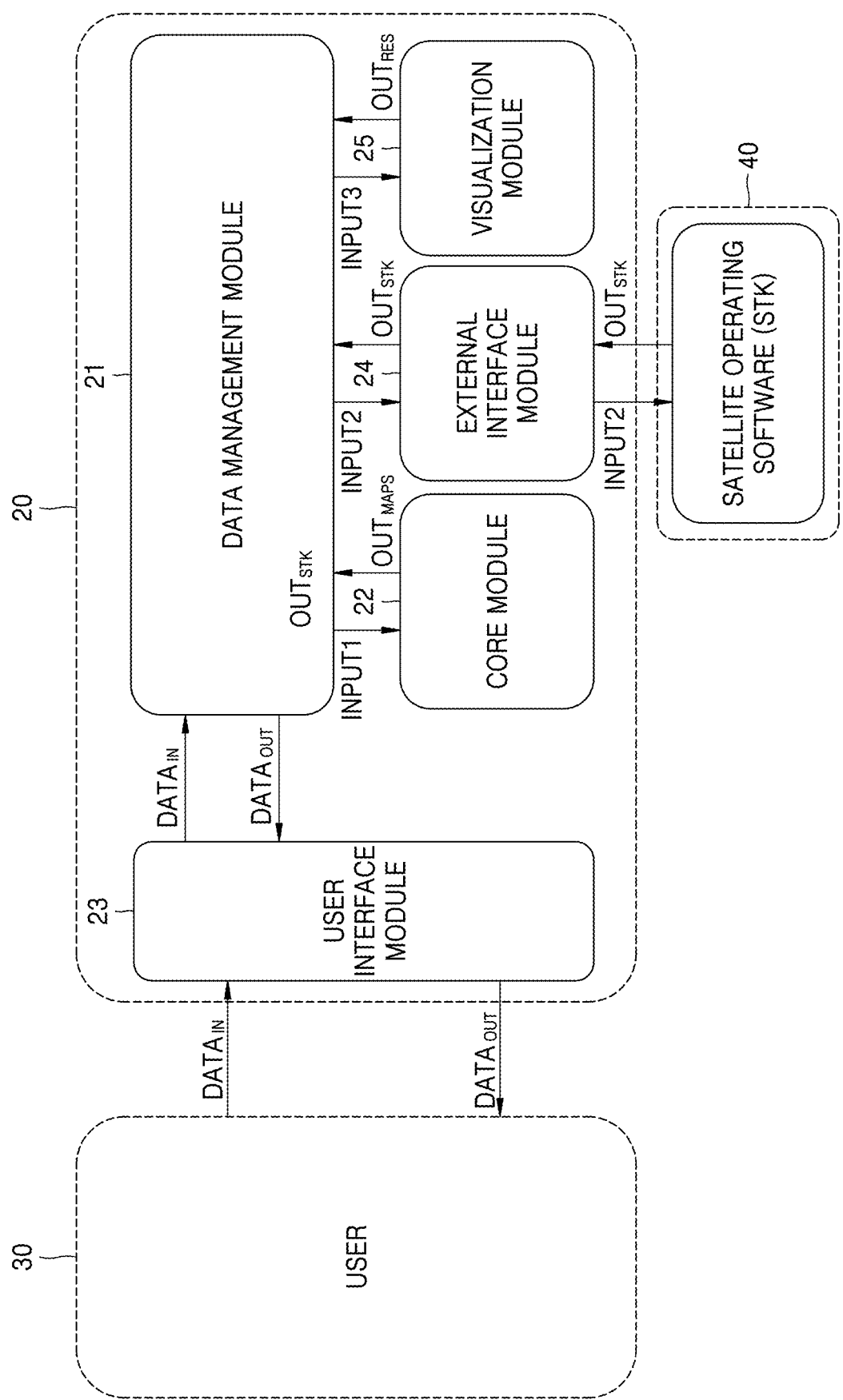
FIG. 9 is a schematic structural diagram of an optimal imaging sequence apparatus for a plurality of satellites, according to an embodiment.

FIG. 9 is a schematic structural diagram of an optimal imaging sequence device 20 for a plurality of satellites, according to an embodiment.

Referring to FIG. 9, the optimal imaging sequence device 20 for the plurality of satellites may include a core module 22 generating output data $DATA_{OUT}$ including an optimal imaging sequence for the plurality of satellites by using a plurality of piece of input data $DATA_{IN}$ received from the user 30 and orbit propagation data $OUT_{STK}$ received from satellite operating software (a systems tool kit (STK)), and a data management module 21 storing the plurality of pieces of input data $DATA_{IN}$, the orbit propagation data $OUT_{STK}$, and the output data $DATA_{OUT}$ and performing transmission and reception between the data. The satellite operating software (STK) 40 may be software used to design a mission of an artificial satellite and predict the performance. The optimal imaging sequence device 20 may further include an external interface module 24, a visualization module 25, and a user interface module 23.

The user interface module 23 may receive the plurality of pieces of input data $DATA_{IN}$ from the user 30 and may provide the visualization data $OUT_{RES}$ generated based on the plurality of pieces of input data $DATA_{IN}$ to the user 30. For example, the plurality of pieces of input data $DATA_{IN}$ may include target data, satellite data, ground station data, algorithm data, and objective result data. The user interface module 23 may manage a software graphics user interface (GUI) through which the input data $DATA_{IN}$ of the user 30 may be input. For example, the user interface module 23 may generate and correct the GUI. The user interface module 23 may transmit the plurality of pieces of input data $DATA_{IN}$ to the data management module 21.

The target data may include a position of an imaging object target and a priority order of the target. The satellite data may include orbit information about an available satellite, a payload, and specific parameters with respect to a satellite. For example, the orbit information about the satellite may include orbit element 6. The ground station data may include a position of a ground station to perform communication with the satellite, a priority order of the ground station, an antenna loaded in the ground station, and specific parameters with respect to the ground station. The algorithm data may include an optimization algorithm selected by the user to generate the optimal imaging sequence. The algorithm data may include one of optimization algorithms realized in software in the optimal imaging sequence generation device 20. For example, the algorithm selection data may include one of a genetic algorithm (GA), a branch-and-bound (BB) algorithm, a greedy algorithm, and a modified dynamic programming (MDP) algorithm. However, the algorithms described above examples, and the types of the optimization algorithms do not limit the disclosure. The objective result data may indicate result data to be derived by the user 30 as a result of analysis and a type of realized form. For example, the objective result data may include one of a chart indicating the optimal imaging sequence, an analysis of a mission success rate of a satellite, and an analysis of a target re-visiting frequency of a satellite. The realized form of the objective result data may include one of a plot, a table, and a chart. However, the type of the objective result data and the realized form described above are only examples and do not limit the disclosure.

The data management module 21 may store and manage the plurality of pieces of input data $DATA_{IN}$ received from the user 30. The data management module 21 may classify pieces of data required for each module and transmit the classified pieces of data, thereby performing a data transmission and reception hub for each module. The data management module 21 may transmit the target data, the satellite data, and the ground station data INPUT2 from among the plurality of pieces of input data $DATA_{IN}$ to the satellite operating software (STK) 40 through the external interface module 24. The satellite operating software (STK) 40 may generate the orbit propagation data $OUT_{STK}$ based on the target data, the satellite data, and the ground station data INPUT2 and may transmit the orbit propagation data $OUT_{STK}$ to the external interface module 24. The data management module 21 may transmit the orbit propagation data $OUT_{STK}$, and the target data, the satellite data, the ground station data, and the algorithm data INPUT1 from among the plurality of pieces of input data $DATA_{IN}$ to the core module 22. The data management module 21 may transmit the result data $OUT_{MAPS}$ and the objective result data INPUT3 received from the user 30 to the visualization module 25. The data management module 21 may transmit the result visualization data $OUT_{RES}$, the result data $OUT_{MAPS}$, and the orbit propagation data $OUT_{STK}$ to the user interface module 23.

The external interface module 24 may perform connection management with the satellite operating software (STK) 40. The external interface module 24 may receive, from the satellite operating software (STK) 40, the orbit propagation data $OUT_{STK}$ generated based on the target data, the satellite data, and the ground station data INPUT2 from among the plurality of pieces of input data $DATA_{IN}$, and may transmit the received orbit propagation data $OUT_{STK}$ to the data management module 21. For example, the orbit propagation data $OUT_{STK}$ may include satellite orbit information, an available time for imaging a target, and an available time for communication with the ground station.

The core module 22 may indicate a module on which imaging and communication optimization algorithms are loaded. The core module 22 may receive the plurality of pieces of input data $DATA_{IN}$ received from the user and the orbit propagation data $OUT_{STK}$ generated from the satellite operating software (STK) 40 and based on the plurality of pieces of input data $DATA_{IN}$ and the orbit propagation data $OUT_{STK}$, may generate the optimal imaging sequence for the plurality of satellites from among the output data $DATA_{OUT}$. For example, data with respect to the optimal imaging sequence for the plurality of satellites may be raw data in the form of a csv file. The core module 22 may generate the optimal imaging sequence for the plurality of satellites based on the plurality of pieces of input data $DATA_{IN}$ and the orbit propagation data $OUT_{STK}$ by using the optimization algorithm according to the algorithm data.

In detail, the core module 22 may receive, from among the plurality of pieces of input data $DATA_{IN}$, the position and the target profit of each of I imaging targets as the target data. The core module 22 may receive, through the data management module 21, from the satellite operating software (STK) 40, the orbit propagation data $OUT_{STK}$ including the orbit information about each of J satellites and K available times for imaging each including an available start time for imaging and an available end time for imaging with respect to an arbitrary imaging target (i, i∈I) from among the I imaging targets with respect to an arbitrary satellite j (j∈J) from among the J satellites. With respect to an arbitrary first imaging target i and an arbitrary second imaging target i' from among the I imaging targets, the core module 22 may calculate a posture maneuverability time of a satellite j for maneuvering from a first satellite posture for imaging the first imaging target i to a second satellite posture for imaging the second imaging target i'. With respect to the arbitrary first and second imaging targets i and i' from among the I imaging targets, the core module 22 may obtain a result of availability of consecutive imaging between the first imaging target i and the second imaging target i', based on a $k^{th}$ available time for imaging from among the K available times for imaging, calculated with respect to the first imaging target i, and the posture maneuverability time of the satellite j. Based on the result of availability of consecutive imaging between the arbitrary first imaging target i and the arbitrary second imaging target i' from among the I imaging targets, the core module 22 may generate a plurality of candidate imaging sequences including at least two arbitrary imaging targets (i, i∈I) from among the I imaging targets. The core module 22 may calculate a plurality of imaging sequence profits from the plurality of candidate imaging sequences, respectively, by using a pre-defined optimization objective function. The core module 22 may determine a set of at least two arbitrary imaging targets (i, i∈I) from among the I imaging targets, included in a candidate imaging sequence having the largest imaging sequence profit of the plurality of imaging sequence profits, as the optimal imaging sequence. In detail, the method, performed by the core module 22, of generating the optimal imaging sequence for the plurality of satellites, is described with reference to FIG. 5. The core module 22 may transmit the result data $OUT_{MAPS}$ including the optimal imaging sequence for the plurality of satellites to the data management module 21.

The visualization module 25 may generate the result visualization data $OUT_{RES}$ by visualizing the result data $OUT_{MAPS}$ according to the objective result data from among the plurality of pieces of input data $DATA_{IN}$. The visualization module 25 may visualize the result data $OUT_{MAPS}$ according to the objective result data input by the user, by analyzing the result data $OUT_{MAPS}$ generated by the core module 22. For example, the visualization module 25 may generate the result visualization data $OUT_{RES}$ by generating the result data $OUT_{MAPS}$ by using a figure, a table, or a chart. For example, the result visualization data $OUT_{RES}$ may be data indicating an imaging schedule, a communication schedule, and a mission success rate. The visualization module 25 may generate the result visualization data $OUT_{RES}$ by visualizing the result data $OUT_{MAPS}$ according to the objective result data and may transmit the result visualization data $OUT_{RES}$ to the data management module 21.

The user interface module 23 may provide the output data $DATA_{OUT}$ including the result visualization data $OUT_{RES}$, the result data OUT$_{MAPS}$, and the orbit propagation data OUT$_{STK}$ to the user 30 through a user display. The orbit propagation data OUT$_{STK}$ and the result data OUT$_{MAPS}$ may be raw data. The result visualization data OUT$_{RES}$ may be the result data OUT$_{MAPS}$ processed according to the objective result data of the user 30.

According to an embodiment, an optimal imaging sequence for a plurality of satellites may be generated by using an algorithm for optimizing an imaging mission plan for the plurality of satellites, and the optimal imaging sequence may be used in real time in a current job of a ground station operating the satellites, without a limit in the number of operating satellites and targets.

According to the disclosure, when an imaging mission is performed on a plurality of ground targets by using an earth observation satellite, a posture maneuverability time of the satellite between the ground targets may be calculated to determine whether consecutive imaging between the ground targets is available. Also, after calculating all imaging sequences available for imaging the plurality of ground targets for the plurality of satellites, an optimal imaging sequence taking into account the total imaging profits may be generated, and thus, target imaging profits for the satellites may be maximized, and the time for the satellites to provide the images may be reduced.

Embodiments are described as above. However, the descriptions about the embodiments in the section of the "detailed description" are only examples, and it would be understood by one of ordinary skill in the art that the disclosure may be variously modified from the descriptions or may have various equivalents to the descriptions.

Also, the disclosure may be realized in various other forms. Thus, it shall be understood that the disclosure is not limited to the descriptions above, the descriptions are given as above for fully conveying the disclosure so that one of ordinary skill in the art may fully understand the scope of the disclosure, and the disclosure is only defined by the claims.

What is claimed is:

1. A method, performed by at least one computing device, of generating an optimal imaging sequence for a plurality of satellites, the method comprising:
    obtaining a position and a target profit of each of I imaging targets;
    obtaining orbit information about each of J satellites;
    with respect to an arbitrary satellite j (j∈J) from among the J satellites,
    calculating K available times for imaging, each comprising an available start time for imaging and an available end time for imaging with respect to an arbitrary imaging target (i, i∈I) from among the I imaging targets;
    with respect to an arbitrary first imaging target i and an arbitrary second imaging target i' from among the I imaging targets, calculating a posture maneuverability time of the arbitrary satellite j for maneuvering from a first satellite posture for imaging the arbitrary first imaging target i to a second satellite posture for imaging the arbitrary second imaging target i';
    with respect to the arbitrary first imaging target i and the arbitrary second imaging target i' from among the I imaging targets, obtaining a result of availability of consecutive imaging between the arbitrary first imaging target i and the arbitrary second imaging target i' based on a $k^{th}$ available time for imaging from among the K available times for imaging calculated with respect to the arbitrary first imaging target i and the posture maneuverability time of the arbitrary satellite j;
    based on the result of availability of the consecutive imaging between the arbitrary first imaging target i and the arbitrary second imaging target i' from among the I imaging targets, generating a plurality of candidate imaging sequences comprising at least two arbitrary imaging targets (i, i∈I) from among the I imaging targets;
    calculating a plurality of imaging sequence profits from the plurality of candidate imaging sequences, respectively, by using a pre-defined optimization objective function; and
    determining, as an optimal imaging sequence, a set of at least two arbitrary imaging targets (i, i∈I), from among the I imaging targets, included in a candidate imaging sequence having a largest imaging sequence profit of the plurality of imaging sequence profits.

2. The method of claim 1, further comprising, with respect to the arbitrary satellite j (j∈J) from among the J satellites, calculating T imaging sequence profits from T candidate imaging sequences, respectively,
    wherein a $t^{th}$ imaging sequence profit $P_{j,t}$ corresponding to a $t^{th}$ candidate imaging sequence from among the T imaging sequence profits is calculated according to $P_{j,t} = \Sigma_{i=1}^{I} \Sigma_{k=1}^{V_{ij}} p_i x_{ijk,t}$
    where I is a total number of imaging targets,
    $p_i$ is a target profit of the arbitrary first imaging target i from among the I imaging targets,
    $V_{ij}$ is a number of available times for imaging with respect to the arbitrary first imaging target i, and
    $x_{ijk,t}$ is an imaging determination value of the arbitrary satellite j with respect to the arbitrary first imaging target i in the $t^{th}$ candidate imaging sequence.

3. The method of claim 2, wherein the largest imaging sequence profit P is defined as $P = \max(\Sigma_{j=1}^{J} \Sigma_{t=1}^{T} p_{j,t})$, and
    the optimal imaging sequence comprises, in the $t^{th}$ candidate imaging sequence of the arbitrary satellite j (j∈J) having the largest imaging sequence profit from among the J satellites, the arbitrary first imaging targets i having 1 as the imaging determination value $x_{ijk,t}$ for the arbitrary satellite j with respect to the arbitrary imaging target (i, i∈I) from among the I imaging targets.

4. The method of claim 2, wherein the obtaining of the result of availability of the consecutive imaging between the arbitrary first imaging target i and the arbitrary second imaging target i' further comprises, when it is determined as $t^s_{ijk} + t^o_{ij} + t^m_{ii'j} + t^s_{ij} \leq t^s_{i'jk}$, setting 1 as the imaging determination value $x_{ijk,t}$ of the arbitrary satellite j with respect to the arbitrary first imaging target i in the $t^{th}$ candidate imaging sequence of the arbitrary satellite j,
    wherein $t^s_{ijk}$ is an actual start time for imaging by the arbitrary satellite j with respect to the arbitrary first imaging target i during the $k^{th}$ available time for imaging from among the K available times for imaging possessed by the arbitrary satellite j with respect to the arbitrary first imaging target i,
    $t^s_{i'jk}$ is an actual start time for imaging by the arbitrary satellite j with respect to the arbitrary second imaging target i' during the $k^{th}$ available time for imaging from among the K available times for imaging possessed by the arbitrary satellite j with respect to the arbitrary second imaging target i',
    $t^o_{ij}$ is an imaging time by the arbitrary satellite j with respect to the arbitrary first imaging target i,
    $t^m_{ii'j}$ is a posture maneuverability time for the arbitrary satellite j to maneuver from a posture for imaging the arbitrary first imaging target i to a posture for imaging the arbitrary second imaging target i', and $t^s_j$ is a posture stabilization time of the arbitrary satellite j.

5. The method of claim 4, wherein the obtaining of the result of availability of the consecutive imaging between the arbitrary first imaging target i and the arbitrary second imaging target i' further comprises:
when it is determined as $t^s_{ijk}+t^o_{ij}+t^m_{ii'j}+t^s_j>t^s_{i'jk}$, setting 0 as the imaging determination value $x_{ijk,t}$ of the arbitrary satellite j with respect to the arbitrary first imaging target i in the $t^{th}$ candidate imaging sequence of the arbitrary satellite j; and
changing the arbitrary second imaging target i' to another arbitrary imaging target (i", i"∈I) except for the arbitrary first imaging target i and the arbitrary second imaging target i' from among the I imaging targets.

6. The method of claim 4, wherein the actual start time $t^s_{ijk}$ for imaging by the arbitrary satellite j during the $k^{th}$ available time for imaging possessed by the arbitrary satellite j with respect to the arbitrary first imaging target i satisfies $T^s_{ijk} \leq t^s_{ijk}$
where $T^s_{ijk}$ is an available start time for imaging of the $k^{th}$ available time for imaging, and
an actual end time $t^s_{ijk}+t^o_{ij}$ for imaging by the arbitrary satellite j with respect to the arbitrary first imaging target i during the $k^{th}$ available time for imaging satisfies $t^s_{ijk}+t^o_{ij} \leq T^e{ijk}$
where $T^e_{ijk}$ is an available end time for imaging of the $k^{th}$ available time for imaging.

7. The method of claim 6, wherein a maximum available time $D_t$ for imaging of the J satellites is defined as $D_t=\Sigma_{j=1}^{J}\Sigma_{i=1}^{I}\Sigma_{k=1}^{V_{ij}} t^o_{ij} x_{ijk,t}$, and
the maximum available time $D_t$ satisfies $D_t \leq \Sigma_{j=1}^{J} d_j$
where $d_j$ is a maximum available time for imaging by the arbitrary satellite j.

8. The method of claim 6, wherein the generating of the candidate imaging sequences of the arbitrary satellite j further comprises, when it is determined as $t^s_{ijk}+t^o_{ij}+t^m_{ii'j}+t^s_j \leq t^s_{i'jk}$, determining the arbitrary second imaging target i' as a next imaging target of the arbitrary first imaging target i.

9. The method of claim 2, wherein the imaging determination value $x_{ijk,t}$ of the arbitrary satellite j with respect to the arbitrary first imaging target i in the $t^{th}$ candidate imaging sequence of the arbitrary satellite j satisfies $N_i^{min} \leq \Sigma_{j=1}^{J}\Sigma_{k=1}^{V_{ij}} x_{ijk,t} \leq N_i^{max}$
where $N_i^{min}$ is a pre-set minimum number of times of imaging of the arbitrary first imaging target i and
$N_i^{max}$ is a pre-set maximum number of times of imaging of the arbitrary first imaging target i.

10. The method of claim 1, wherein a target profit $p_i$ of the arbitrary first imaging target i of the I imaging targets is calculated according to $p_i=a \times s_i+(1-a)u_i$
where $s_i$ is a value indicating a degree of significance of the arbitrary first imaging target i,
$u_i$ is a value indicating a degree of imaging urgency of the arbitrary first imaging target i, and
a is a pre-set weight value between about 0 and about 1.

11. The method of claim 1, wherein the posture maneuverability time $t^m_{ii'j}$ of the arbitrary satellite j is calculated based on $t^m_{ii'j}=\theta_{ii'j}/\omega_j$
where $\omega_j$ is a maneuverability angular velocity of the arbitrary satellite j, and
$\theta_{ii'j}$ is a posture maneuverability angle of the arbitrary satellite j formed by a vector from the arbitrary satellite j to the arbitrary first imaging target i and a vector from the arbitrary satellite j to the arbitrary second imaging target i' and is defined as $$\theta_{ii'j} = \arccos(\vec{r} \cdot \vec{r'}).$$

where $\vec{r}$ is a unit vector from the arbitrary satellite j to the arbitrary first imaging target i and $\vec{r'}$ is a unit vector from the arbitrary satellite j to the arbitrary second imaging target i'.

12. A non-transitory computer-readable medium storing a computer program when executed by a computing device, performed the method of claim 1.

13. A system for generating an optimal imaging sequence for a plurality of satellites, the system comprising:
a ground station to obtain a position and a target profit of each of I imaging targets;
and a satellite portion to obtain orbit information about each of J satellites and transmit the obtained orbit information to the ground station,
wherein the ground station comprises:
a calculator for calculating an available time for imaging and configured to calculate, with respect to an arbitrary satellite j (j∈J) from among the J satellites, K available times for imaging, each comprising an available start time for imaging and an available end time for imaging with respect to an arbitrary imaging target (i, i∈I) from among the I imaging targets;
a calculator for calculating a posture maneuverability time and configured to calculate, with respect to an arbitrary first imaging target i and an arbitrary second imaging target i' from among the I imaging targets, a posture maneuverability time of the arbitrary satellite j for maneuvering from a first satellite posture for imaging the arbitrary first imaging target i to a second satellite posture for imaging the arbitrary second imaging target i';
an obtainer for obtaining a consecutive imaging result and configured to obtain, with respect to the arbitrary first imaging target i and the arbitrary second imaging target i' from among the I imaging targets, a result of availability of consecutive imaging between the arbitrary first imaging target i and the arbitrary second imaging target i', based on a $k^{th}$ available time for imaging from among the K available times for imaging calculated with respect to the arbitrary first imaging target i and the posture maneuverability time of the arbitrary satellite j;
a generator for generating a candidate imaging sequence and configured to generate, based on the result of availability of the consecutive imaging between the arbitrary first imaging target i and the arbitrary second imaging target i' from among the I imaging targets, a plurality of candidate imaging sequences including at least two arbitrary imaging targets (i, i∈I) from among the I imaging targets;
a calculator for calculating an imaging sequence profit and configured to calculate a plurality of imaging sequence profits from the plurality of candidate imaging sequences, respectively, by using a pre-defined optimization objective function; and a determining portion for determining an optimal imaging sequence and configured to determine, as an optimal imaging sequence, a set of at least two arbitrary imaging targets (i, i∈I) from among the I imaging targets, included in a candidate imaging sequence having a largest imaging sequence profit of the plurality of imaging sequence profits, and the satellite portion comprises a target image capturing portion to receive the optimal imaging sequence and capture a target image according to the optimal imaging sequence.

14. An apparatus for generating an optimal imaging sequence for a plurality of satellites, the apparatus comprising: a core module to generate output data comprising an optimal imaging sequence for a plurality of satellites by using a plurality of pieces of input data received from a user and orbit propagation data received from satellite operating software (a systems tool kit (STK)); and a data management module to store the plurality of pieces of input data, the orbit propagation data, and the output data and perform transmission and reception with respect to the data, wherein the core module is configured to:

receive a position and a target profit of each of I imaging targets as target data from among the plurality of pieces of input data;

receive, from the satellite operating software, the orbit propagation data comprising orbit information about each of J satellites and K available times for imaging, each comprising an available start time for imaging and an available end time for imaging with respect to an arbitrary imaging target (i, i∈I) from among the I imaging targets with respect to an arbitrary satellite j (j∈J) from among the J satellites;

with respect to an arbitrary first imaging target i and an arbitrary second imaging target i' from among the I imaging targets, calculate a posture maneuverability time of the arbitrary satellite j for maneuvering from a first satellite posture for imaging the arbitrary first imaging target i to a second satellite posture for imaging the arbitrary second imaging target i';

with respect to the arbitrary first imaging target i and the arbitrary second imaging target i' from among the I imaging targets, obtain a result of availability of consecutive imaging between the arbitrary first imaging target i and the arbitrary second imaging target i' based on a $k^{th}$ available time for imaging from among the K available times for imaging calculated with respect to the arbitrary first imaging target i and the posture maneuverability time of the arbitrary satellite j;

based on the result of availability of the consecutive imaging between the arbitrary first imaging target i and the arbitrary second imaging target i' from among the I imaging targets, generate a plurality of candidate imaging sequences comprising at least two arbitrary imaging targets (i, i∈I) from among the I imaging targets;

calculate a plurality of imaging sequence profits from the plurality of candidate imaging sequences, respectively, by using a pre-defined optimization objective function; and determine, as an optimal imaging sequence, a set of at least two arbitrary imaging targets (i, i∈I) from among the I imaging targets, included in a candidate imaging sequence having a largest imaging sequence profit of the plurality of imaging sequence profits.

15. The apparatus of claim 14, further comprising:

an external interface module to receive, from the satellite operating software (STK), the orbit propagation data generated based on the target data, satellite data, and ground station data from among the plurality of pieces of input data and transmit the received orbit propagation data to the data management module;

a visualization module to generate result visualization data by analyzing result data including the optimal imaging sequence, according to objective result data desired by the user from among the plurality of pieces of input data; and a user interface module to receive the plurality of pieces of input data from the user and provide the result visualization data generated based on the plurality of pieces of input data to the user.

* * * * *